US011865558B2

(12) United States Patent
Volk et al.

(10) Patent No.: US 11,865,558 B2
(45) Date of Patent: Jan. 9, 2024

(54) NOZZLE FOR A SPRAY GUN, NOZZLE SET FOR A SPRAY GUN, SPRAY GUNS AND METHODS FOR PRODUCING A NOZZLE FOR A SPRAY GUN

(71) Applicant: SATA GmbH & Co. KG, Kornwestheim (DE)

(72) Inventors: Eva Volk, Ludwigsburg (DE); Dietrich Wolter, Bietigheim-Bissingen (DE); Stefan Gehret, Tuebingen (DE); Michael Pantle, Gemmrigheim (DE); Norbert Maier, Allmersbach i.T. (DE)

(73) Assignee: SATA GmbH & Co. KG, Kornwestheim (DE)

( * ) Notice: Subject to any disclaimer, the term of this patent is extended or adjusted under 35 U.S.C. 154(b) by 0 days.

(21) Appl. No.: 16/524,838

(22) Filed: Jul. 29, 2019

(65) Prior Publication Data

US 2020/0038889 A1 Feb. 6, 2020

(30) Foreign Application Priority Data

Aug. 1, 2018 (DE) ..................... 10 2018 118 737.8

(51) Int. Cl.
*B05B 1/34* (2006.01)
*B05B 11/06* (2006.01)
(Continued)

(52) U.S. Cl.
CPC .................. *B05B 1/34* (2013.01); *B05B 7/08* (2013.01); *B05B 11/0005* (2013.01); *B05B 11/06* (2013.01)

(58) Field of Classification Search
CPC ....... B05B 1/34; B05B 11/06; B05B 11/0005; B05B 7/08; B05B 7/2478; B05B 7/068; B05B 7/0815; B05B 7/066
(Continued)

(56) References Cited

U.S. PATENT DOCUMENTS 40,433 A 10/1863 Sees
327,260 A 9/1885 Hart
(Continued)

FOREIGN PATENT DOCUMENTS

AT 153883 6/1997
AT 163577 3/1998
(Continued)

OTHER PUBLICATIONS

Response restriction requirement filed May 23, 2016 for Design U.S. Appl. No. 29/516,082.
(Continued)

*Primary Examiner* — Chee-Chong Lee
(74) *Attorney, Agent, or Firm* — Paul D. Bianco; Stephen Bongini; Fleit Intellectual Property Law

(57) ABSTRACT

A nozzle for a spray gun, in particular a paint spray gun, has at least one material nozzle having a hollow portion for the passage of material to be sprayed; a material outlet opening; and a disk element extending radially from the material nozzle and having at least one passage opening. The nozzle has at least one first baffle disk which is arranged on the disk element and has an inner and an outer circumference. The first baffle disk is arranged on the disk element directly, in particular without a sealing element arranged inbetween. The disadvantages that separate sealing elements have to be specially produced and may be lost or damaged, can thereby be avoided. The nozzle according to the disclosure and related nozzle sets, paint spray guns and methods for producing nozzles are functionally reliable, have only few individual parts and a compact design and are quiet.

11 Claims, 9 Drawing Sheets

(51) Int. Cl.
*B05B 11/00* (2023.01)
*B05B 7/08* (2006.01)

(58) Field of Classification Search
USPC .......................................................... 239/290
See application file for complete search history.

(56) References Cited

U.S. PATENT DOCUMENTS 459,432 A 9/1891 Anderson
459,433 A 9/1891 Avery
548,816 A 10/1895 Paul
552,213 A 12/1895 Troy
552,715 A 1/1896 Lugrin
563,505 A 7/1896 McCornack
581,107 A 4/1897 Emery
644,803 A 3/1900 Justi
672,012 A 4/1901 Ruper
574,880 A 5/1901 Schmidt et al.
1,662,496 A 3/1928 Forsgard
1,703,383 A 2/1929 Birkenmaier
1,703,384 A 2/1929 Birkenmaier
1,711,221 A 4/1929 Blakeslee
1,751,787 A 3/1930 Binks
1,889,201 A 11/1932 Holveck
2,004,303 A 6/1935 Wahlin
2,008,381 A 7/1935 Beeg
2,049,700 A 8/1936 Gustafsson
2,051,210 A 8/1936 Gustafsson
2,070,696 A 2/1937 Tracy
2,116,036 A 5/1938 Money
2,125,445 A 8/1938 Holveck
2,198,441 A 4/1940 Mollart
2,204,599 A 6/1940 Jenkins
2,269,057 A 1/1942 Jenkins
D133,223 S 7/1942 Tammen
2,356,865 A 8/1944 Mason
2,416,856 A 3/1947 Thomsen
2,416,923 A 3/1947 Jenkins
2,470,718 A * 5/1949 Peeps .................... B05B 7/0815 239/300
2,533,953 A * 12/1950 Peeps .................... B05B 7/1263 239/412
2,557,593 A 6/1951 Bjorkman
2,557,606 A 6/1951 Liedberg
2,559,091 A 7/1951 Reasenberg
2,609,961 A 9/1952 Sapien
2,612,899 A 10/1952 Webb
2,646,314 A 7/1953 Peeps
2,721,004 A 10/1955 Schultz
2,743,963 A 5/1956 Peeps
2,844,267 A 7/1958 Petriccione
2,886,252 A 5/1959 Ehrensperger
3,090,530 A 5/1963 Peeps
D196,477 S 10/1963 Kelly
3,159,472 A 12/1964 Revell
D200,594 S 3/1965 Sass
3,240,398 A 3/1966 Dalton, Jr.
D204,306 S 4/1966 Hamm
D205,760 S 9/1966 Hocutt et al.
D208,903 S 10/1967 Zadron et al.
3,344,992 A 10/1967 Norris
3,381,845 A 5/1968 MacDonald
3,417,650 A 12/1968 Varrin
3,420,106 A 1/1969 Keller et al.
3,435,683 A 4/1969 Keller et al.
3,482,781 A 12/1969 Sharpe
D217,928 S 6/1970 Felske
3,524,589 A 8/1970 Pelton, Jr.
3,527,372 A 9/1970 Manning
3,583,632 A 6/1971 Schaffer
3,622,078 A 11/1971 Gronert
3,645,562 A 2/1972 Fandetti et al.
3,656,493 A 4/1972 Black et al.
3,714,967 A 2/1973 Zupan et al.
3,746,253 A 7/1973 Walberg
3,747,850 A 7/1973 Hastings et al.
3,771,539 A 11/1973 De Santis
3,840,143 A 10/1974 Davis et al.
3,848,807 A 11/1974 Partida
3,857,511 A 12/1974 Govindan
3,870,223 A 3/1975 Wyant
3,873,023 A 3/1975 Moss et al.
3,938,739 A 2/1976 Bertilsson et al.
4,000,915 A 1/1977 Strom
D245,048 S 7/1977 Pool
D252,097 S 6/1979 Probst et al.
4,160,525 A 7/1979 Wagner
4,171,091 A 10/1979 van Hardeveld et al.
4,210,263 A 7/1980 Bos
4,273,293 A 6/1981 Hastings
4,278,276 A 7/1981 Ekman
4,411,387 A 10/1983 Stern et al.
4,478,370 A 10/1984 Hastings
D276,472 S 11/1984 Harrison
D278,543 S 4/1985 Gintz
4,545,536 A 10/1985 Avidon
4,562,965 A 1/1986 Ihmels et al.
4,572,437 A 2/1986 Huber et al.
4,580,035 A 4/1986 Luscher
4,585,168 A 4/1986 Even et al.
4,614,300 A 9/1986 Falcoff
4,643,330 A 2/1987 Kennedy
4,653,661 A 3/1987 Buchner et al.
4,667,878 A 5/1987 Behr
4,713,257 A 12/1987 Luttermoeller
D293,950 S 1/1988 Ogden et al.
4,730,753 A 3/1988 Grime
4,767,057 A 8/1988 Degli
D298,372 S 11/1988 Taylor, Jr.
4,784,184 A 11/1988 Gates
4,806,736 A 2/1989 Schirico
4,826,539 A 5/1989 Harpold
4,832,232 A 5/1989 Broccoli
4,844,347 A 7/1989 Konhäuser
4,854,504 A * 8/1989 Hedger, Jr. ........... B05B 7/0815 239/294
4,863,781 A 9/1989 Kronzer
4,877,144 A 10/1989 Thanisch
D305,057 S 12/1989 Morgan
4,887,747 A 12/1989 Ostrowsky et al.
4,901,761 A 2/1990 Taylor
4,906,151 A 3/1990 Kubis
4,917,300 A 4/1990 Gloviak et al.
4,946,075 A 8/1990 Lundback
4,964,361 A 10/1990 Aebersold
4,967,600 A 11/1990 Keller
4,969,603 A 11/1990 Norman
4,973,184 A 11/1990 La Salle
D314,421 S 2/1991 Tajima et al.
D314,588 S 2/1991 Denham
4,989,787 A 2/1991 Nikkel et al.
5,020,700 A 6/1991 Krzywdziak et al.
D318,877 S 8/1991 Miranda et al.
5,042,840 A 8/1991 Rieple et al.
D321,597 S 11/1991 Cerny
5,064,119 A 11/1991 Mellette
5,071,074 A 12/1991 Lind
5,074,334 A 12/1991 Onodera
5,078,323 A 1/1992 Frank
5,080,285 A 1/1992 Toth
5,088,648 A 2/1992 Schmon
5,090,623 A 2/1992 Burns et al.
5,102,045 A 4/1992 Diana
5,119,992 A 6/1992 Grime
5,125,391 A 6/1992 Srivastava et al.
5,135,124 A 8/1992 Wobser
5,143,102 A 9/1992 Blaul
5,165,605 A 11/1992 Morita
5,170,941 A 12/1992 Morita et al.
5,190,219 A 3/1993 Copp, Jr.
5,191,797 A 3/1993 Smith
5,209,405 A 5/1993 Robinson
5,228,488 A 7/1993 Fletcher
5,232,299 A 8/1993 Hiss

(56) References Cited

U.S. PATENT DOCUMENTS

| | | | |
|---|---|---|---|
| 5,236,128 | A | 8/1993 | Morita et al. |
| 5,249,746 | A | 10/1993 | Kaneko et al. |
| D341,186 | S | 11/1993 | Albers |
| 5,289,974 | A | 3/1994 | Grime et al. |
| 5,322,221 | A | 6/1994 | Anderson |
| 5,325,473 | A | 6/1994 | Monroe et al. |
| 5,332,156 | A | 7/1994 | Wheeler |
| 5,333,506 | A | 8/1994 | Smith et al. |
| 5,333,908 | A | 8/1994 | Dorney et al. |
| 5,344,078 | A | 9/1994 | Fritz et al. |
| 5,367,148 | A | 11/1994 | Storch et al. |
| D353,836 | S | 12/1994 | Carvelli et al. |
| 5,381,962 | A | 1/1995 | Teague |
| 5,435,491 | A | 7/1995 | Sakuma |
| 5,443,642 | A | 8/1995 | Bienduga |
| 5,456,414 | A | 10/1995 | Burns |
| D365,952 | S | 1/1996 | Gagnon et al. |
| 5,503,439 | A | 4/1996 | LaJeunesse et al. |
| 5,529,245 | A | 6/1996 | Brown |
| 5,533,674 | A | 7/1996 | Feyrer et al. |
| 5,540,385 | A | 7/1996 | Garlick |
| 5,540,386 | A | 7/1996 | Roman |
| D376,637 | S | 12/1996 | Kieffer |
| 5,582,350 | A | 12/1996 | Kosmyna et al. |
| 5,584,899 | A | 12/1996 | Shorts |
| 5,588,562 | A | 12/1996 | Sander et al. |
| 5,592,597 | A | 1/1997 | Kiss |
| 5,609,302 | A | 3/1997 | Smith |
| 5,613,637 | A | 3/1997 | Schmon |
| D380,301 | S | 7/1997 | Kogutt |
| 5,655,714 | A | 8/1997 | Kieffer et al. |
| 5,662,444 | A | 9/1997 | Schmidt, Jr. |
| 5,667,143 | A | 9/1997 | Sebion et al. |
| 5,695,125 | A | 12/1997 | Kumar |
| 5,704,381 | A | 1/1998 | Millan et al. |
| 5,718,767 | A | 2/1998 | Crum et al. |
| D391,403 | S | 3/1998 | Josephs |
| 5,725,161 | A | 3/1998 | Hartle |
| RE35,769 | E | 4/1998 | Grime et al. |
| 5,755,363 | A | 5/1998 | Gantner et al. |
| 5,762,228 | A | 6/1998 | Morgan et al. |
| 5,803,360 | A | 9/1998 | Spitznagel |
| 5,816,501 | A | 10/1998 | LoPresti et al. |
| 5,829,682 | A | 11/1998 | Haruch |
| 5,836,517 | A | 11/1998 | Burns et al. |
| D402,820 | S | 12/1998 | Morison et al. |
| 5,843,515 | A | 12/1998 | Crum et al. |
| 5,853,014 | A | 12/1998 | Rosenauer |
| D405,503 | S | 2/1999 | Endo |
| 5,874,680 | A | 2/1999 | Moore |
| 5,884,006 | A | 3/1999 | Frohlich et al. |
| D409,719 | S | 5/1999 | Kaneko |
| 5,941,461 | A | 8/1999 | Akin et al. |
| 5,951,190 | A | 9/1999 | Wilson |
| 5,951,296 | A | 9/1999 | Klein |
| 5,954,268 | A | 9/1999 | Joshi et al. |
| D414,636 | S | 10/1999 | Wiese |
| 5,979,797 | A | 11/1999 | Castellano |
| 5,992,763 | A | 11/1999 | Smith et al. |
| 6,006,930 | A | 12/1999 | Dreyer et al. |
| 6,010,082 | A | 1/2000 | Peterson |
| 6,017,394 | A | 1/2000 | Crum et al. |
| 6,019,294 | A | 2/2000 | Anderson |
| 6,036,109 | A | 3/2000 | DeYoung |
| 6,039,218 | A | 3/2000 | Beck |
| 6,050,499 | A | 4/2000 | Takayama |
| 6,053,429 | A | 4/2000 | Chang |
| 6,056,213 | A | 5/2000 | Ruta et al. |
| 6,056,215 | A | 5/2000 | Hansinger |
| 6,089,471 | A | 7/2000 | Scholl |
| 6,089,607 | A | 7/2000 | Keeney et al. |
| 6,091,053 | A | 7/2000 | Aonuma |
| 6,092,740 | A | 7/2000 | Liu |
| 6,132,511 | A | 10/2000 | Crum et al. |
| D435,379 | S | 12/2000 | Nguyen |
| 6,230,986 | B1 | 5/2001 | Vacher et al. |
| 6,250,567 | B1 | 6/2001 | Lewis et al. |
| 6,267,301 | B1 | 7/2001 | Haruch |
| 6,276,616 | B1 | 8/2001 | Jenkins |
| D448,451 | S | 9/2001 | Turnbull et al. |
| 6,308,991 | B1 | 10/2001 | Royer |
| D457,599 | S | 5/2002 | Karwoski |
| D459,432 | S | 6/2002 | Schmon |
| D459,433 | S | 6/2002 | Schmon |
| 6,402,058 | B2 | 6/2002 | Kaneko et al. |
| 6,402,062 | B1 | 6/2002 | Bending et al. |
| 6,431,466 | B1 | 8/2002 | Kitajima |
| 6,435,426 | B1 | 8/2002 | Copp, Jr. |
| 6,442,276 | B1 | 8/2002 | Doljack |
| 6,450,422 | B1 | 9/2002 | Maggio |
| 6,494,387 | B1 | 12/2002 | Kaneko |
| 6,536,684 | B1 | 3/2003 | Wei |
| 6,536,687 | B1 | 3/2003 | Navis et al. |
| D472,730 | S | 4/2003 | Sparkowski |
| 6,540,114 | B1 | 4/2003 | Popovich et al. |
| 6,543,632 | B1 | 4/2003 | McIntyre et al. |
| 6,547,160 | B1 | 4/2003 | Huang |
| 6,547,884 | B1 | 4/2003 | Crum et al. |
| 6,553,712 | B1 | 4/2003 | Majerowski et al. |
| 6,554,009 | B1 | 4/2003 | Beijbom et al. |
| D474,528 | S | 5/2003 | Huang |
| 6,585,173 | B2 | 7/2003 | Schmon et al. |
| 6,595,441 | B2 | 7/2003 | Petrie et al. |
| 6,612,506 | B1 | 9/2003 | Huang |
| 6,626,382 | B1 | 9/2003 | Liu |
| 6,626,383 | B1 | 9/2003 | Campbell |
| 6,647,997 | B2 | 11/2003 | Mohn |
| 6,661,438 | B1 | 12/2003 | Shiraishi et al. |
| D485,685 | S | 1/2004 | Zupkofska et al. |
| 6,675,845 | B2 | 1/2004 | Volpenheim et al. |
| 6,692,118 | B2 | 2/2004 | Michele et al. |
| 6,712,292 | B1 | 3/2004 | Gosis et al. |
| 6,717,584 | B2 | 4/2004 | Kulczycka |
| 6,732,751 | B2 | 5/2004 | Chiang |
| 6,763,964 | B1 | 7/2004 | Hurlbut et al. |
| 6,766,763 | B2 | 7/2004 | Crum et al. |
| 6,786,345 | B2 | 9/2004 | Richards |
| 6,796,514 | B1 | 9/2004 | Schwartz |
| 6,801,211 | B2 | 10/2004 | Forsline et al. |
| 6,820,824 | B1 | 11/2004 | Joseph et al. |
| 6,843,390 | B1 | 1/2005 | Bristor |
| 6,845,924 | B2 | 1/2005 | Schmon |
| 6,855,173 | B2 | 2/2005 | Ehrnsperger et al. |
| 6,863,310 | B1 | 3/2005 | Petkovsek |
| 6,863,920 | B2 | 3/2005 | Crum et al. |
| 6,874,656 | B2 | 4/2005 | Rohr et al. |
| 6,874,664 | B1 | 4/2005 | Montgomery |
| 6,874,708 | B2 | 4/2005 | Reetz, III |
| 6,877,677 | B2 | 4/2005 | Schmon et al. |
| 6,929,019 | B2 | 8/2005 | Weinmann et al. |
| 6,945,429 | B2 | 9/2005 | Gosis et al. |
| 6,955,180 | B2 | 10/2005 | Kocherlakota et al. |
| 6,962,432 | B2 | 11/2005 | Hofeldt |
| 6,963,331 | B1 | 11/2005 | Kobayashi et al. |
| 7,017,838 | B2 | 3/2006 | Schmon |
| 7,018,154 | B2 | 3/2006 | Schmon |
| D519,687 | S | 4/2006 | Zahav |
| 7,032,839 | B2 | 4/2006 | Blette et al. |
| 7,036,752 | B1 | 5/2006 | Hsiang |
| 7,083,119 | B2 | 8/2006 | Bouic et al. |
| 7,090,148 | B2 | 8/2006 | Petrie et al. |
| 7,097,118 | B1 | 8/2006 | Huang |
| D528,192 | S | 9/2006 | Nicholson |
| 7,106,343 | B1 | 9/2006 | Hickman |
| 7,165,732 | B2 | 1/2007 | Kosmyna et al. |
| 7,172,139 | B2 | 2/2007 | Bouic et al. |
| 7,175,110 | B2 | 2/2007 | Vicentini |
| 7,182,213 | B2 | 2/2007 | King |
| D538,050 | S | 3/2007 | Tardif |
| D538,493 | S | 3/2007 | Zimmerle et al. |
| D538,886 | S | 3/2007 | Huang |
| 7,194,829 | B2 | 3/2007 | Boire et al. |
| D541,053 | S | 4/2007 | Sanders |
| D541,088 | S | 4/2007 | Nesci |

(56) References Cited

U.S. PATENT DOCUMENTS

| | | | |
|---|---|---|---|
| 7,201,336 | B2 | 4/2007 | Blette et al. |
| 7,216,813 | B2 | 5/2007 | Rogers |
| D545,943 | S | 7/2007 | Rodgers et al. |
| 7,246,713 | B2 | 7/2007 | King |
| 7,249,519 | B2 | 7/2007 | Rogers |
| D548,816 | S | 8/2007 | Schmon |
| 7,255,293 | B2 | 8/2007 | Dodd |
| 7,264,131 | B2 | 9/2007 | Tsutsumi et al. |
| D552,213 | S | 10/2007 | Schmon |
| D552,715 | S | 10/2007 | Schmon |
| D554,703 | S | 11/2007 | Josephson |
| 7,328,855 | B2 * | 2/2008 | Chatron ................ B05B 7/0815 239/290 |
| D563,505 | S | 3/2008 | Schmon |
| 7,374,111 | B2 | 5/2008 | Joseph et al. |
| D571,463 | S | 6/2008 | Chesnin |
| 7,384,004 | B2 | 6/2008 | Rogers |
| RE40,433 | E | 7/2008 | Schmon |
| D573,227 | S | 7/2008 | Mirazita et al. |
| D574,926 | S | 8/2008 | Huang |
| D575,374 | S | 8/2008 | Huang |
| 7,410,106 | B2 | 8/2008 | Escoto, Jr. et al. |
| 7,416,140 | B2 | 8/2008 | Camilleri et al. |
| 7,422,164 | B2 | 9/2008 | Matsumoto |
| D579,213 | S | 10/2008 | Aipa |
| D581,107 | S | 11/2008 | Schmon |
| D581,483 | S | 11/2008 | Bass et al. |
| D583,013 | S | 12/2008 | Wang |
| 7,458,612 | B1 | 12/2008 | Bennett |
| 7,472,840 | B2 | 1/2009 | Gregory |
| D588,231 | S | 3/2009 | Pellin |
| 7,533,678 | B2 | 5/2009 | Rosa |
| 7,540,434 | B2 | 6/2009 | Gohring et al. |
| 7,542,032 | B2 | 6/2009 | Kruse |
| 7,568,638 | B2 | 8/2009 | Gehrung |
| D604,394 | S | 11/2009 | Wang |
| 7,614,571 | B2 | 11/2009 | Camilleri et al. |
| D607,086 | S | 12/2009 | Kosaka |
| 7,624,869 | B2 | 12/2009 | Primer |
| D607,972 | S | 1/2010 | Wang |
| D608,858 | S | 1/2010 | Baltz et al. |
| D614,731 | S | 4/2010 | Wang |
| 7,694,893 | B2 | 4/2010 | Zittel et al. |
| 7,694,896 | B2 | 4/2010 | Turnbull et al. |
| D615,586 | S | 5/2010 | Kudimi |
| D616,022 | S | 5/2010 | Kudimi |
| D616,527 | S | 5/2010 | Anderson et al. |
| 7,765,876 | B1 | 8/2010 | Chen |
| D624,668 | S | 9/2010 | Noppe |
| 7,810,744 | B2 | 10/2010 | Schmon et al. |
| 7,819,341 | B2 | 10/2010 | Schmon et al. |
| D627,039 | S | 11/2010 | Yu |
| D627,432 | S | 11/2010 | Escoto et al. |
| 7,823,806 | B2 | 11/2010 | Schmon |
| D629,623 | S | 12/2010 | Lampe |
| 7,856,940 | B2 | 12/2010 | Wendler |
| 7,913,938 | B2 | 3/2011 | Cooper |
| 7,922,107 | B2 | 4/2011 | Fox |
| D637,269 | S | 5/2011 | Wang |
| D638,121 | S | 5/2011 | Villasana |
| D639,863 | S | 6/2011 | Langan |
| D641,067 | S | 7/2011 | Wang |
| D644,716 | S | 9/2011 | Gehrung |
| D644,803 | S | 9/2011 | Schmon |
| D645,094 | S | 9/2011 | Langan |
| 8,042,402 | B2 | 10/2011 | Brown et al. |
| D649,196 | S | 11/2011 | Langan |
| 8,052,071 | B2 | 11/2011 | Kruse |
| D655,347 | S | 3/2012 | Gehrung |
| 8,127,963 | B2 | 3/2012 | Gerson et al. |
| D657,276 | S | 4/2012 | Brose |
| D661,492 | S | 6/2012 | Ranschau |
| D661,742 | S | 6/2012 | Clark |
| D663,960 | S | 7/2012 | Jeronimo |
| 8,225,892 | B2 | 7/2012 | Ben-Tzvi |
| D664,773 | S | 8/2012 | Papin |
| 8,240,579 | B1 | 8/2012 | Bennett |
| 8,297,536 | B2 | 10/2012 | Ruda |
| D670,085 | S | 11/2012 | Brookman |
| D671,988 | S | 12/2012 | Leipold |
| D672,012 | S | 12/2012 | Brose |
| D674,880 | S | 1/2013 | Schmon |
| 8,352,744 | B2 | 1/2013 | Kruse |
| 8,360,345 | B2 | 1/2013 | Micheli |
| D681,162 | S | 4/2013 | Kruse |
| 8,444,067 | B2 | 5/2013 | Schmon et al. |
| 8,454,759 | B2 | 6/2013 | Selsvik |
| 8,481,124 | B2 | 7/2013 | Nolte et al. |
| D689,590 | S | 9/2013 | Brose |
| D689,593 | S | 9/2013 | Schmon |
| D690,799 | S | 10/2013 | Maier |
| D692,530 | S | 10/2013 | Gehrung |
| D692,532 | S | 10/2013 | Li et al. |
| 8,616,434 | B2 | 12/2013 | Wilen |
| D697,584 | S | 1/2014 | Schmon |
| D698,008 | S | 1/2014 | Schmon et al. |
| 8,626,674 | B2 | 1/2014 | Whitehouse |
| 8,642,131 | B2 | 2/2014 | Nolte et al. |
| D704,300 | S | 5/2014 | Li |
| 8,757,182 | B2 | 6/2014 | Schmon |
| 8,807,460 | B2 | 8/2014 | Charpie et al. |
| 8,857,732 | B2 | 10/2014 | Brose |
| D720,015 | S | 12/2014 | Kruse |
| D720,041 | S | 12/2014 | Robinson |
| 8,899,501 | B2 | 12/2014 | Fox et al. |
| D721,785 | S | 1/2015 | Gehrung |
| 8,925,836 | B2 | 1/2015 | Dettlaff |
| D733,369 | S | 6/2015 | Tschan |
| D733,453 | S | 7/2015 | Tschan |
| D734,428 | S | 7/2015 | Wang |
| D734,429 | S | 7/2015 | Wang |
| D734,571 | S | 7/2015 | Tschan |
| 9,073,068 | B2 | 7/2015 | Krayer et al. |
| D737,126 | S | 8/2015 | Tschan |
| D740,393 | S | 10/2015 | Gehrung |
| D745,636 | S | 12/2015 | Lin |
| 9,220,853 | B2 | 12/2015 | Vogt |
| D757,216 | S | 5/2016 | Gherung |
| D758,533 | S | 6/2016 | Dettlaff |
| D758,537 | S | 6/2016 | Gehrung |
| D768,820 | S | 10/2016 | Binz |
| D770,593 | S | 11/2016 | Gehrung |
| 9,498,788 | B2 | 11/2016 | Kosaka |
| 9,533,317 | B2 | 1/2017 | Gehrung |
| D792,557 | S | 7/2017 | Wang |
| D794,756 | S | 8/2017 | Wang |
| 9,782,784 | B2 | 10/2017 | Schmon et al. |
| 9,878,336 | B2 | 1/2018 | Gehrung |
| 9,878,340 | B2 | 1/2018 | Schmon et al. |
| D835,235 | S | 12/2018 | Gehrung et al. |
| 10,189,037 | B2 | 1/2019 | Schmon et al. |
| 10,247,313 | B2 | 4/2019 | Chien |
| 10,464,076 | B2 | 11/2019 | Kruse |
| 10,471,449 | B2 | 11/2019 | Gehrung |
| 10,702,879 | B2 | 7/2020 | Gehrung |
| D929,838 | S | 9/2021 | Tschan |
| 11,141,747 | B2 | 10/2021 | Schmon |
| 2001/0004996 | A1 | 6/2001 | Schmon |
| 2001/0040192 | A1 | 11/2001 | Kaneko et al. |
| 2002/0092928 | A1 | 7/2002 | Conroy |
| 2002/0134861 | A1 | 9/2002 | Petrie et al. |
| 2002/0148501 | A1 | 10/2002 | Shieh |
| 2002/0170978 | A1 | 11/2002 | Mohn |
| 2003/0006322 | A1 | 1/2003 | Hartle et al. |
| 2003/0025000 | A1 | 2/2003 | Schmon |
| 2003/0066218 | A1 | 4/2003 | Schweikert |
| 2003/0121476 | A1 | 7/2003 | McIntyre et al. |
| 2003/0127046 | A1 | 7/2003 | Zehner et al. |
| 2003/0164408 | A1 | 9/2003 | Schmon |
| 2003/0173419 | A1 | 9/2003 | Huang |
| 2003/0177979 | A1 | 9/2003 | Crum et al. |
| 2003/0189105 | A1 | 10/2003 | Schmon |
| 2003/0209568 | A1 | 11/2003 | Douglas et al. |
| 2003/0213857 | A1 | 11/2003 | Schmon et al. |

(56) References Cited

U.S. PATENT DOCUMENTS

2003/0218596 A1 11/2003 Eschler
2003/0230636 A1 12/2003 Rogers
2004/0046051 A1 3/2004 Santa Cruz et al.
2004/0050432 A1 3/2004 Breda
2004/0104194 A1 6/2004 Dennison
2004/0129738 A1 7/2004 Stukas
2004/0140373 A1 7/2004 Joseph et al.
2004/0155063 A1 8/2004 Hofeldt
2004/0159720 A1 8/2004 Komornicki
2004/0177890 A1 9/2004 Weinmann
2004/0191406 A1 9/2004 Crum et al.
2004/0217201 A1 11/2004 Ruda
2004/0233223 A1 11/2004 Schkolne et al.
2004/0245208 A1 12/2004 Dennison
2005/0001060 A1 1/2005 Robinson
2005/0056613 A1 3/2005 King
2005/0082249 A1 4/2005 King
2005/0127201 A1 6/2005 Matsumoto
2005/0145723 A1 7/2005 Blette et al.
2005/0145724 A1 7/2005 Blette et al.
2005/0161525 A1 7/2005 Johansson
2005/0178854 A1 8/2005 Dodd
2005/0189445 A1 9/2005 Hartle et al.
2005/0215284 A1 9/2005 Su
2005/0218246 A1 10/2005 Chatron
2005/0220943 A1 10/2005 Abrams et al.
2005/0248148 A1 11/2005 Schenck et al.
2005/0252993 A1 11/2005 Rogers
2005/0252994 A1 11/2005 Rogers
2005/0268949 A1 12/2005 Rosa
2005/0284963 A1 12/2005 Reedy
2006/0000927 A1 1/2006 Ruda
2006/0007123 A1 1/2006 Wilson et al.
2006/0048803 A1 3/2006 Jessup et al.
2006/0081060 A1 4/2006 Forster
2006/0108449 A1 5/2006 Sodemann
2006/0113409 A1 6/2006 Camilleri et al.
2006/0118661 A1 6/2006 Hartle
2006/0131151 A1 6/2006 Marchand
2006/0171771 A1 8/2006 Kruse
2006/0192377 A1 8/2006 Bauer et al.
2006/0196891 A1 9/2006 Gerson et al.
2007/0029788 A1 2/2007 Adler
2007/0055883 A1 3/2007 Kruse
2007/0131795 A1 6/2007 Abbate et al.
2007/0158349 A1 7/2007 Schmon et al.
2007/0205305 A1 9/2007 Vagedes
2007/0221754 A1 9/2007 Gehrung
2007/0228190 A1 10/2007 Tanner
2007/0252378 A1 11/2007 Chambers
2007/0262169 A1 11/2007 Wang
2007/0262172 A1 11/2007 Huffman
2008/0011879 A1 1/2008 Gerson et al.
2008/0019789 A1 1/2008 Dunaway et al.
2008/0029619 A1 2/2008 Gohring et al.
2008/0128533 A1 6/2008 Gehrung
2008/0179763 A1 7/2008 Schmon et al.
2008/0251607 A1 10/2008 Krayer
2008/0251977 A1 10/2008 Naruse et al.
2008/0264892 A1 10/2008 Nozawa
2008/0272213 A1 11/2008 Ting
2008/0296410 A1 12/2008 Carey et al.
2009/0014557 A1 1/2009 Schmon et al.
2009/0026288 A1 1/2009 Shih
2009/0026290 A1 1/2009 Fox
2009/0045623 A1 2/2009 Schmon
2009/0072050 A1 3/2009 Ruda
2009/0078789 A1 3/2009 Kruse
2009/0078790 A1 3/2009 Camilleri et al.
2009/0143745 A1 6/2009 Langan et al.
2009/0152382 A1 6/2009 Charpie
2009/0179081 A1 7/2009 Charpie
2009/0183516 A1 7/2009 Appler et al.
2009/0235864 A1 9/2009 Khoury et al.
2009/0266915 A1 10/2009 Fedorov
2010/0021646 A1 1/2010 Nolte et al.
2010/0059533 A1 3/2010 Unger et al.
2010/0084493 A1 4/2010 Troudt
2010/0108783 A1 5/2010 Joseph et al.
2010/0126541 A1 5/2010 Schmon
2010/0163649 A1 7/2010 Bass et al.
2010/0206963 A1 8/2010 Huang
2010/0270390 A1 10/2010 Reitz
2010/0270400 A1 10/2010 Evar et al.
2011/0024524 A1 2/2011 Fox
2011/0121103 A1 5/2011 Carleton et al.
2011/0125607 A1 5/2011 Wilen
2011/0127767 A1 6/2011 Wicks et al.
2011/0168811 A1 7/2011 Fox et al.
2011/0174901 A1 7/2011 Dettlaff et al.
2012/0012671 A1 1/2012 Brose et al.
2012/0097762 A1 4/2012 Gehrung et al.
2012/0132550 A1 5/2012 Gerson et al.
2012/0160935 A1 6/2012 Krayer et al.
2012/0187220 A1 7/2012 Micheli et al.
2013/0056556 A1 3/2013 Schmon et al.
2013/0074864 A1 3/2013 Nuzzo et al.
2013/0092760 A1 4/2013 Joseph
2013/0266734 A1 10/2013 Nolte et al.
2013/0320110 A1 12/2013 Brose et al.
2013/0327850 A1 12/2013 Joseph
2014/0034757 A1 2/2014 Kaneko
2014/0048627 A1 2/2014 Schmon et al.
2014/0059905 A1 3/2014 Raming
2014/0145003 A1 5/2014 Schmon et al.
2014/0263686 A1 9/2014 Hedger
2014/0305962 A1 10/2014 Tschan
2014/0339322 A1 11/2014 Freers
2014/0346257 A1 11/2014 Reetz, III et al.
2015/0108254 A1 4/2015 Commette
2015/0165463 A1 6/2015 Gehrung
2015/0231655 A1 8/2015 Adams et al.
2016/0030960 A1 2/2016 Gehrung
2017/0252771 A1 9/2017 Young
2017/0304852 A1 10/2017 Bierie
2018/0050355 A1 2/2018 Delsard
2018/0050356 A1 2/2018 Gehrung
2018/0050361 A1 2/2018 Gehrung
2018/0050362 A1 2/2018 Gehrung
2018/0133727 A1 5/2018 Schmon et al.
2018/0200740 A1 7/2018 Rossbach et al.
2020/0038889 A1 2/2020 Volk
2020/0038892 A1 2/2020 Volk et al.
2021/0379612 A1 12/2021 Volk
2022/0048054 A1 2/2022 Maier
2022/0080448 A1 3/2022 Volk
2023/0107860 A1 4/2023 Maier

FOREIGN PATENT DOCUMENTS

AT 250467 10/2003
AT 322645 4/2006
AT 383910 2/2008
AT 461752 4/2010
AT 461753 4/2010
AT 475488 8/2010
AU 637187 5/1993
AU 2002352235 9/2003
AU 2004315547 8/2005
AU 2005205899 8/2005
AU 2011257605 11/2012
AU 2011361295 5/2013
CA 521511 2/1956
CA 2126957 1/1995
CA 2277096 7/1998
CA 2445183 10/2002
CA 2552390 8/2005
CA 2555607 8/2005
CA 2690112 5/2009
CA 2797990 12/2011
CA 2812684 9/2012
CA 102917803 2/2013
CA 2850401 A1 5/2013
CH 200754 A 10/1938

(56) References Cited

FOREIGN PATENT DOCUMENTS

| | | | |
|---|---|---|---|
| CH | 203 668 | | 6/1939 |
| CH | 523 098 | A | 5/1972 |
| CH | 523098 | A | 5/1972 |
| CH | 542104 | A | 9/1973 |
| CH | 676208 | | 12/1990 |
| CN | 2136077 | Y | 6/1993 |
| CN | 1738310 | A | 2/2006 |
| CN | 1899704 | A | 1/2007 |
| CN | 1902002 | | 1/2007 |
| CN | 1909970 | | 2/2007 |
| CN | 1909971 | | 2/2007 |
| CN | 1917960 | | 2/2007 |
| CN | 200954482 | | 10/2007 |
| CN | 101125316 | | 2/2008 |
| CN | 201064746 | Y | 5/2008 |
| CN | 100430150 | | 11/2008 |
| CN | 100455360 | | 1/2009 |
| CN | 101367066 | | 2/2009 |
| CN | 100478080 | | 4/2009 |
| CN | 101516523 | A | 8/2009 |
| CN | 101646500 | | 2/2010 |
| CN | 102211070 | | 4/2011 |
| CN | 102139249 | A | 8/2011 |
| CN | 102211069 | | 10/2011 |
| CN | 103 521 378 | A | 1/2014 |
| CN | 103521378 | A | 1/2014 |
| CN | 203508251 | U | 4/2014 |
| CN | 203737474 | U | 7/2014 |
| CN | 204074345 | U | 1/2015 |
| CN | 204294401 | U | 4/2015 |
| CN | 105377447 | A | 3/2016 |
| CN | 205966208 | U | 2/2017 |
| CN | 107427851 | A | 12/2017 |
| CN | 107666966 | A | 2/2018 |
| CN | 108223901 | A | 6/2018 |
| CN | 207493903 | U | 6/2018 |
| CN | 108438227 | A | 8/2018 |
| DE | 259621 | C | 5/1913 |
| DE | 460381 | | 5/1928 |
| DE | 510362 | | 10/1930 |
| DE | 611325 | C | 3/1935 |
| DE | 1425890 | | 11/1968 |
| DE | 2559036 | | 9/1976 |
| DE | 2653981 | | 6/1978 |
| DE | 2950341 | | 7/1980 |
| DE | 2926286 | A1 | 1/1981 |
| DE | 3016419 | | 11/1981 |
| DE | 8024829.9 | | 9/1982 |
| DE | 3111571 | A1 | 10/1982 |
| DE | 3238149 | A1 | 4/1984 |
| DE | 34 02 097 | | 8/1985 |
| DE | 3402945 | A1 | 8/1985 |
| DE | 3517122 | | 5/1986 |
| DE | 3505618 | | 8/1986 |
| DE | 3526819 | | 2/1987 |
| DE | 3016419 | C2 | 8/1987 |
| DE | 8702559 | | 10/1987 |
| DE | 3708472 | A1 | 10/1988 |
| DE | 8902223 | | 5/1989 |
| DE | 3742308 | | 6/1989 |
| DE | 8905681 | | 11/1989 |
| DE | G 90 01 265 | | 5/1990 |
| DE | 3906219 | | 8/1990 |
| DE | 4302911 | | 8/1993 |
| DE | 4208500 | A1 | 9/1993 |
| DE | 4230535 | | 3/1994 |
| DE | G 94 16 015.5 | U1 | 11/1994 |
| DE | 4321940 | | 1/1995 |
| DE | 692 11 891 | T2 | 10/1996 |
| DE | 69211891 | T2 | 10/1996 |
| DE | 19516485 | | 11/1996 |
| DE | 19727884 | | 2/1999 |
| DE | 69505433 | T2 | 4/1999 |
| DE | 19807973 | | 7/1999 |
| DE | 19824264 | | 12/1999 |
| DE | 19832990 | | 1/2000 |
| DE | 20000483 | | 8/2000 |
| DE | 10004105 | | 10/2000 |
| DE | 19958569 | | 2/2001 |
| DE | 199 41 362 | | 3/2001 |
| DE | 199 45 760 | | 3/2001 |
| DE | 19945760 | | 3/2001 |
| DE | 10103221 | A1 | 8/2001 |
| DE | 10031857 | | 1/2002 |
| DE | 10031858 | | 1/2002 |
| DE | 20114257 | | 2/2002 |
| DE | 10059406 | | 6/2002 |
| DE | 10135104 | | 9/2002 |
| DE | 10135104 | C1 | 9/2002 |
| DE | 102 05 831 | | 8/2003 |
| DE | 10205831 | | 8/2003 |
| DE | 10311238 | | 10/2004 |
| DE | 10 2004 027 789 | | 2/2005 |
| DE | 29825120 | | 2/2005 |
| DE | 102004027789 | A1 | 2/2005 |
| DE | 69827994 | T2 | 4/2005 |
| DE | 20320781 | | 6/2005 |
| DE | 10 2004 014 646 | | 7/2005 |
| DE | 10 2004 003 438 | | 8/2005 |
| DE | 102004003439 | | 8/2005 |
| DE | 10 2004 007 733 | | 9/2005 |
| DE | 10 2004 021 298 | | 11/2005 |
| DE | 699 28 944 | T2 | 9/2006 |
| DE | 69928944 | T2 | 9/2006 |
| DE | 69535077 | T2 | 11/2006 |
| DE | 202007001031 | | 3/2007 |
| DE | 60200500 1173 | | 8/2007 |
| DE | 60206956 | T2 | 8/2008 |
| DE | 102007006547 | | 8/2008 |
| DE | 102007013628 | A1 | 9/2008 |
| DE | 102007039106 | | 2/2009 |
| DE | 102007052067 | | 5/2009 |
| DE | 10 2009 020 194 | A1 | 11/2010 |
| DE | 20 2010 012 449 | U1 | 12/2010 |
| DE | 202010012449 | | 12/2010 |
| DE | 202010012449 | U1 | 12/2010 |
| DE | 10 2009 032 399 | A1 | 1/2011 |
| DE | 102009032399 | A1 | 1/2011 |
| DE | 102009053449 | | 2/2011 |
| DE | 102010060086 | | 4/2012 |
| DE | 10 2010 056 263 | A1 | 6/2012 |
| DE | 102010056263 | A1 | 6/2012 |
| DE | 102011106060 | | 1/2013 |
| DE | 102011118120 | | 5/2013 |
| DE | 10 2011 120 717 | A1 | 6/2013 |
| DE | 112007001824 | B4 | 7/2013 |
| DE | 10 2012 013 464 | A1 | 11/2013 |
| DE | 102015114202 | A1 | 1/2017 |
| DE | 10 2018 118 737 | A1 | 2/2020 |
| DE | 10 2018 118737 | A1 | 2/2020 |
| DE | 102018118737 | A1 | 2/2020 |
| EM | 002066910-0001 | | 3/2013 |
| EM | 002066910-0002 | | 3/2013 |
| EM | 002066910-0003 | | 3/2013 |
| EM | 002066910-0004 | | 3/2013 |
| EM | 002066910-0005 | | 3/2013 |
| EM | 002066910-0006 | | 3/2013 |
| EM | 002066910-0007 | | 3/2013 |
| EM | 002066910-0008 | | 3/2013 |
| EM | 002066910-0009 | | 3/2013 |
| EM | 002066910-0010 | | 3/2013 |
| EP | 0092043 | A2 | 10/1983 |
| EP | 0092392 | | 10/1983 |
| EP | 0114064 | A2 | 7/1984 |
| EP | 0313958 | A2 | 5/1989 |
| EP | 524408 | | 1/1993 |
| EP | 567325 | | 10/1993 |
| EP | 0631821 | | 1/1995 |
| EP | 0650766 | | 5/1995 |
| EP | 0650766 | A2 | 5/1995 |
| EP | 678334 | | 10/1995 |
| EP | 0706832 | | 4/1996 |
| EP | 0706832 | A1 | 4/1996 |
| EP | 0710506 | | 5/1996 |

(56) References Cited

FOREIGN PATENT DOCUMENTS

| | | | |
|---|---|---|---|
| EP | 801002 | | 10/1997 |
| EP | 0846498 | A1 | 6/1998 |
| EP | 987060 | | 3/2000 |
| EP | 1081639 | | 3/2001 |
| EP | 1106262 | | 6/2001 |
| EP | 1 247 586 | | 10/2002 |
| EP | 1247586 | | 10/2002 |
| EP | 1277519 | | 1/2003 |
| EP | 1294490 | | 3/2003 |
| EP | 1299194 | | 4/2003 |
| EP | 1366823 | | 12/2003 |
| EP | 1412669 | | 4/2004 |
| EP | 1424135 | | 6/2004 |
| EP | 1477232 | A1 | 11/2004 |
| EP | 1479447 | A1 | 11/2004 |
| EP | 1504823 | A1 | 2/2005 |
| EP | 1563913 | | 8/2005 |
| EP | 1574262 | | 9/2005 |
| EP | 1602412 | | 12/2005 |
| EP | 1658902 | A1 | 5/2006 |
| EP | 1708822 | | 10/2006 |
| EP | 1708823 | | 10/2006 |
| EP | 1718415 | | 11/2006 |
| EP | 1880771 | A1 | 1/2008 |
| EP | 1902766 | A1 | 3/2008 |
| EP | 1902786 | | 3/2008 |
| EP | 1902876 | | 3/2008 |
| EP | 1930084 | | 6/2008 |
| EP | 1964616 | | 9/2008 |
| EP | 1964616 | A2 | 9/2008 |
| EP | 1987886 | A2 | 11/2008 |
| EP | 1997561 | A2 | 12/2008 |
| EP | 2017010 | A2 | 1/2009 |
| EP | 2027931 | | 2/2009 |
| EP | 2092987 | A1 | 8/2009 |
| EP | 2106298 | | 10/2009 |
| EP | 2111920 | | 10/2009 |
| EP | 2127758 | A1 | 12/2009 |
| EP | 2451586 | A1 | 5/2012 |
| EP | 2490819 | | 8/2012 |
| EP | 2576079 | | 4/2013 |
| EP | 2608890 | | 7/2013 |
| EP | 2 669 213 | A1 | 12/2013 |
| EP | 2703089 | A1 | 3/2014 |
| EP | 2736651 | B1 | 6/2014 |
| EP | 2 828 000 | A | 1/2015 |
| EP | 2 828 000 | A1 | 1/2015 |
| EP | 3184177 | A1 | 6/2017 |
| EP | 2828000 | B1 | 8/2019 |
| FR | 398333 | | 6/1909 |
| FR | 789762 | | 11/1935 |
| FR | 1410519 | | 9/1964 |
| FR | 2444501 | | 7/1980 |
| FR | 2462200 | A1 | 2/1981 |
| FR | 2 570 140 | | 3/1986 |
| FR | 2 774 928 | | 8/1999 |
| FR | 2 863 512 | A1 | 6/2005 |
| FR | 2863512 | A1 | 6/2005 |
| FR | 2927824 | A1 | 8/2009 |
| GB | 190900523 | | 6/1909 |
| GB | 657854 | A | 9/1951 |
| GB | 2 132 916 | | 7/1984 |
| GB | 2153260 | | 8/1985 |
| GB | 2372465 | | 8/2002 |
| GB | 2411235 | | 8/2005 |
| GB | 2416141 | A | 1/2006 |
| GB | 2444909 | A | 6/2008 |
| HK | 1100405 | | 6/2009 |
| HK | 1096057 | | 7/2009 |
| HK | 1125067 | | 8/2012 |
| HK | 1138533 | | 11/2012 |
| JP | S49-136868 | U | 11/1974 |
| JP | S55-107258 | U | 7/1980 |
| JP | S5654328 | | 5/1981 |
| JP | S57-75246 | | 5/1982 |
| JP | S57128346 | A | 8/1982 |
| JP | 58-119862 | | 5/1983 |
| JP | S5998757 | | 6/1984 |
| JP | S601722 | | 1/1985 |
| JP | S62160156 | A | 7/1987 |
| JP | H01-87805 | | 6/1989 |
| JP | H02258076 | A | 10/1990 |
| JP | H04-176352 | A | 6/1992 |
| JP | H0530749 | | 4/1993 |
| JP | H05172678 | | 7/1993 |
| JP | 674850 | | 3/1994 |
| JP | H06215741 | | 8/1994 |
| JP | H07204542 | A | 8/1995 |
| JP | H08196950 | | 8/1996 |
| JP | H08196950 | A | 8/1996 |
| JP | H09117697 | | 5/1997 |
| JP | 11-047643 | A | 2/1999 |
| JP | 2000015150 | A | 1/2000 |
| JP | 2000070780 | A | 3/2000 |
| JP | 2001259487 | | 9/2001 |
| JP | 2003042882 | | 2/2002 |
| JP | 2003088780 | | 3/2003 |
| JP | 2004-501763 | A | 1/2004 |
| JP | 2004017044 | | 1/2004 |
| JP | 2005000735 | A | 1/2005 |
| JP | 2005138885 | | 6/2005 |
| JP | 2007516831 | | 6/2007 |
| JP | 2008018296 | A | 1/2008 |
| JP | 2008161789 | A | 7/2008 |
| JP | 2010-528837 | A | 8/2010 |
| JP | 2014124274 | A | 7/2014 |
| KR | 20140064644 | A | 5/2014 |
| RU | 2523816 | C1 | 1/2014 |
| TW | 491092 | | 6/2002 |
| TW | 510253 | U | 11/2002 |
| TW | I220392 | | 8/2004 |
| TW | I303587 | | 12/2008 |
| TW | I309584 | | 5/2009 |
| WO | 90/008456 | | 8/1990 |
| WO | 91/16610 | | 10/1991 |
| WO | 1992/07346 | | 4/1992 |
| WO | 9522409 | | 8/1995 |
| WO | 1998/32539 | | 7/1998 |
| WO | 01/012337 | | 2/2001 |
| WO | 2001/12337 | | 2/2001 |
| WO | 0166261 | | 9/2001 |
| WO | 01/099062 | | 12/2001 |
| WO | 02/000355 | | 1/2002 |
| WO | 0202242 | | 1/2002 |
| WO | 02/018061 | | 3/2002 |
| WO | 02/085533 | | 10/2002 |
| WO | 03/007252 | | 1/2003 |
| WO | 03/045575 | | 6/2003 |
| WO | 03/069208 | | 8/2003 |
| WO | 03069208 | A1 | 8/2003 |
| WO | 03/086654 | A1 | 10/2003 |
| WO | 04/037433 | | 5/2004 |
| WO | 2004/37433 | | 5/2004 |
| WO | 04/052552 | | 6/2004 |
| WO | 05/018815 | | 3/2005 |
| WO | 05/068220 | | 7/2005 |
| WO | 05/070557 | | 8/2005 |
| WO | 05/070558 | | 8/2005 |
| WO | 05/077543 | | 8/2005 |
| WO | 05/115631 | | 12/2005 |
| WO | 2006065850 | | 6/2006 |
| WO | 07/128127 | | 11/2007 |
| WO | 2007133386 | A2 | 11/2007 |
| WO | 2007/149760 | A2 | 12/2007 |
| WO | 2008/093866 | A1 | 8/2008 |
| WO | 2009015260 | | 1/2009 |
| WO | 2009015260 | A2 | 1/2009 |
| WO | 2009/054986 | A1 | 4/2009 |
| WO | 2009056424 | | 5/2009 |
| WO | 2010019274 | A1 | 2/2010 |
| WO | 2010/044864 | A1 | 4/2010 |
| WO | 2011047876 | | 4/2011 |
| WO | 2011147555 | | 12/2011 |
| WO | 2012/013574 | A1 | 2/2012 |

(56) References Cited

FOREIGN PATENT DOCUMENTS

| | | | |
|---|---|---|---|
| WO | 2012/052255 | A1 | 4/2012 |
| WO | 2012119664 | | 9/2012 |
| WO | 2013000524 | | 1/2013 |
| WO | 2013016474 | | 1/2013 |
| WO | 2013/131626 | A1 | 9/2013 |
| WO | 2013/142045 | A1 | 9/2013 |
| WO | 2014/006593 | A1 | 1/2014 |
| WO | 2015/125619 | A1 | 8/2015 |
| WO | 2016/127106 | A1 | 8/2016 |
| WO | 2016/188804 | A1 | 12/2016 |
| WO | 2017/096740 | A1 | 6/2017 |
| WO | 2018/197025 | A1 | 10/2017 |
| WO | 2020/053153 | A | 3/2020 |
| WO | 2020/0053153 | A1 | 3/2020 |
| WO | 2020/086977 | A1 | 4/2020 |

OTHER PUBLICATIONS

Canadian Office Action dated Nov. 21, 2012 for related application CA2741703.
Chinese Search Report dated Dec. 5, 2012 for related application CN200980135429.9.
Chinese Office Action dated Dec. 13, 2012 for related application CN200980135429.9.
German Search Report for DE 20 2008 014 389.6 completed Jul. 13, 2009.
Response to Office Action dated Jun. 25, 2018 for U.S. Appl. No. 14/815,210.
Response to Final Office Action dated Aug. 22, 2018 for U.S. Appl. No. 14/113,649.
Chinese Search Report for Application No. 2017107135569 dated Aug. 24, 2020 and English translation.
International Preliminary Report on Patentability for PCT/EP2015/001728 filed Aug. 25, 2015.
Final Office Action dated Mar. 16, 2017 from U.S. Appl. No. 13/698,417, 9 pages.
German Search Report for Application No. 10 2016 009 957.7 dated Apr. 21, 2017.
Final Office Action dated Dec. 7, 2017 for U.S. Appl. No. 14/815,210.
Response to Final Office Action, for U.S. Appl. No. 15/679,533, filed Jan. 4, 2021.
European Search Report dated Feb. 21, 2020 for Application No. 19183382.1.
Response dated Feb. 19, 2020 for U.S. Appl. No. 15/575,549.
Response to Final Office Action and RCE dated Nov. 29, 2016 in U.S. Appl. No. 14/113,649.
Written Opinion dated Sep. 8, 2016 for International Application No. PCT/EP2016/061057 filed May 18, 2016.
Restriction Requirement Office Action dated Aug. 28, 2018 in U.S. Appl. No. 15/679,533.
Restriction Requirement Office Action dated Aug. 28, 2018 in U.S. Appl. No. 15/679,461.
Notice of Allowance dated Sep. 14, 2018 in U.S. Appl. No. 29/618,945.
Notice of Allowance dated Sep. 14, 2018 in U.S. Appl. No. 14/113,649.
U.S. Appl. No. 14/815,210 Office Action dated Apr. 3, 2018.
U.S. Appl. No. 14/113,649 Response filed Mar. 3, 2018.
German Search Report dated Apr. 10, 2018 for Application No. 10 2017 118 599.2.
For U.S. Appl. No. 15/679,533: Interview Summary dated Jun. 17, 2020 Response to Office Action, filed Jun. 30, 2020.
Office Action dated Jun. 12, 2020, for U.S. Appl. No. 15/575,549.
Final Office Action dated Feb. 27, 2020 for U.S. Appl. No. 15/575,549.
Response to Restriction Requirement filed Jul. 27, 2015 to Restriction Requirement dated May 27, 2015 for U.S. Appl. No. 13/991,285.
Application filed Jul. 31, 2015 for U.S. Appl. No. 14/815,210.
Final Office Action dated Aug. 4, 2015 for U.S. Appl. No. 13/380,949.
Notice of Allowance dated Aug. 3, 2015 for U.S. Appl. No. 29/486,232.
Office Action dated Jun. 30, 2017 for U.S. Appl. No. 14/815,210.
Final Office Action in U.S. Appl. No. 14/113,649 dated Jun. 22, 2017.
Response filed in U.S. Appl. No. 15/143,698 dated Jul. 3, 2017.
Restriction Requirement Office Action dated Apr. 17, 2017 for U.S. Appl. No. 14/815,210.
Notice of Allowance dated Apr. 10, 2017 for U.S. Appl. No. 29/579,824.
Response to Final Office Action filed May 9, 2017 in U.S. Appl. No. 13/698,417.
Response to Office Action filed May 17, 2017 in U.S. Appl. No. 14/113,649.
Office Action dated Aug. 7, 2015 for U.S. Appl. No. 13/991,285.
Response to Restriction Requirement filed in U.S. Appl. No. 14/815,210 dated Jun. 19, 2017.
Japanese Office Action dated Sep. 25, 2019, for Japanese Publication No. 2015-149405, 4 pages.
Search Report dated Feb. 22, 2019 for German Patent Application No. 10 2018 118 738.6.
Search Report dated Feb. 8, 2019 for German Patent Application No. 10 2018 118 737.8.
Notice of Allowance dated Jul. 1, 2019 for U.S. Appl. No. 15/379,972.
Notice of Allowance dated Jul. 9, 2019 for U.S. Appl. No. 15/679,482.
Restriction Requirement dated Mar. 18, 2019, for U.S. Appl. No. 29/596,869.
Office Action dated Mar. 15, 2019, for U.S. Appl. No. 14/815,210.
Office Action dated Feb. 19, 2016 for U.S. Appl. No. 14/113,649.
Final Office Action dated Feb. 25, 2016 for U.S. Appl. No. 13/698,417.
Restriction Requirement dated Mar. 25, 2016 for Design U.S. Appl. No. 29/516,082.
Response filed Mar. 31, 2016 to Office Action dated Dec. 31, 2016 for U.S. Appl. No. 14/572,998.
International Search Report dated Jul. 14, 2016 for International Application No. PCT/EP2016/000809, filed May 17, 2016.
Written Opinion for International Application No. PCT/EP2016/000809, filed May 17, 2016.
International Search Report dated Aug. 31, 2016 for PCT/EP2016/061057 filed May 18, 2016.
Written Opinion for PCT/EP2016/061057 filed May 18, 2016.
International Search Report, Written Opinion and International Preliminary Report on Patentability for PCT/EP2004/005381 file May 19, 2004.
International Search Report, Written Opinion and International Preliminary Report on Patentability for PCT/EP2004/011998 filed Oct. 23, 2004.
International Search Report, Written Opinion and International Preliminary Report on Patentability for PCT/EP2005/000435 filed Jan. 18, 2005.
International Search Report, Written Opinion and International Preliminary Report on Patentability for PCT/EP2005/00437 filed Jan. 18, 2005.
International Search Report, Written Opinion and International Preliminary Report on Patentability for PCT/EP2008/063344, filed Oct. 6, 2008.
International Search Report, Written Opinion and International Preliminary Report on Patentability for PCT/EP2010/002392 filed Apr. 20, 2010.
International Search Report, Written Opinion and International Preliminary Report on Patentability for PCT/EP2011/002544 filed May 21, 2011.
International Search Report, Written Opinion and International Preliminary Report on Patentability for PCT/EP2011/066665 filed Sep. 26, 2011.
International Search Report, Written Opinion and International Preliminary Report on Patentability for PCT/EP2010/003399 filed Jun. 7, 2010.
International Search Report, Written Opinion and International Preliminary Report on Patentability for PCT/EP2011/5842 filed Dec. 2, 2010.

(56) References Cited

OTHER PUBLICATIONS

International Search Report, Written Opinion and International Preliminary Report on Patentability for PCT/EP2012/01939 filed May 5, 2012.
International Search Report, Written Opinion and International Preliminary Report on Patentability for PCT/EP2009/06992 filed Sep. 29, 2009.
Internet Archive Wayback Machine [online] [captured Sep. 25, 2012] [retrieved on Sep. 8, 2014] retrieved from the Internet URL:http://web.archive.org/web/20120925210554/http://www.sata.com/index.php?id=sal-check&no cache=1&L=11.
JP Office Action issued against JP Patent App. 2012-508926 dated Feb. 25, 2014 with English translation.
Notice of Allowance dated Sep. 17, 2020 for U.S. Appl. No. 15/679,461.
Second Chinese Office Action dated Jun. 24, 2015 for Chinese Application No. 2011800266029.
Third Chinese Office Action dated Nov. 30, 2015 for Chinese Application No. 2011800266029.
Final Office Action dated Aug. 29, 2016 for U.S. Appl. No. 14/113,649.
Office Action dated Nov. 2, 2016 for U.S. Appl. No. 11/949,122.
Response filed May 28, 2019 for U.S. Appl. No. 15,379,972.
Final Office Action for U.S. Appl. No. 15/679,461 dated Jun. 11, 2019.
Final Office Action for U.S. Appl. No. 15/679,533 dated Jul. 12, 2019.
Office Action dated Jan. 25, 2019 for U.S. Appl. No. 15/379,972.
Office Action dated Nov. 18, 2014 for U.S. Appl. No. 14/113,649.
Notice of Allowance dated Nov. 19, 2014 for U.S. Appl. No. 29/486,223.
Office Action dated Dec. 31, 2014 for U.S. Appl. No. 13/380,949.
Restriction Requirement dated Jan. 9, 2015 for Design U.S. Appl. No. 29/469,049.
Response to Office Action filed Dec. 2, 2014 for U.S. Appl. No. 29/487,679.
Notice of Allowance dated Jan. 15, 2015 for Design U.S. Appl. No. 29/490,620.
Office Action dated Jan. 14, 2015 for Design U.S. Appl. No. 29/447,887.
Hercules Paint Gun Washers brochure publish date Jan. 2012, [online], [site visited Jan. 7, 2015], <http://www.herkules.us/pdfs/L00761-Hercules-Gun_Washers-4-page-brochure.pdf>.
Jetclean GUn Cleaner Terry's Auto Supply, google publish date Aug. 4, 2011, [online], [site visited Jan. 7, 2015], <http://secure.terrys.net/viewProduct.php?productID=FT.FHAZ1005>.
Restriction Requirement dated Feb. 6, 2015 for Design U.S. Appl. No. 29/486,232.
Office Action dated Mar. 30, 2015 for U.S. Appl. No. 13/698,417.
Responde to Office Action filed Apr. 14, 2015 to Office Action dated Jan. 14, 2015 for U.S. Appl. No. 29/447,887.
Response filed Jul. 20, 2015 for Office Action dated Mar. 30, 2015 for U.S. Appl. No. 13/698,417.
Notice of Allowance dated Apr. 30, 2015 for U.S. Appl. No. 29/447,887.
Chinese Office Action dated Oct. 28, 2014 and Search Report dared Oct. 15, 2014 for Chinese Application No. 2011800266029.
Australian Examination Report dated Oct. 30, 2012 for Australian Application No. 2010268870.
Notice of Allowance dated Apr. 24, 2015 for Design U.S. Appl. No. 29/486,232.
Restriction Requirement dated Jan. 22, 2015 for U.S. Appl. No. 13/698,417.
Response filed Mar. 23, 2015 to Restriction Requirement dated Jan. 22, 2015 for U.S. Appl. No. 13/698,417.
Response filed Apr. 6, 2015 to Office Action dated Feb. 6, 2015 for Design U.S. Appl. No. 29/486,232.
Response filed Mar. 31, 2015 to Office Action dated Dec. 31, 2014 for U.S. Appl. No. 13/380,949.
Japanese Office Action dated Jun. 11, 2014 for Japanese Patent Application No. 2012-518769.
Australian Examination Report dated Nov. 11, 2014 for Australian patent Application No. 2011257605.
Japanese Notice of Allowance dated Jan. 13, 2015 for Japanese Patent Application No. 2012/518769.
Application filed Dec. 11, 2011 for U.S. Appl. No. 13/380,949.
Chinese Office Action dated Jan. 28, 2014 and Search Report dated Jan. 21, 2014 for Chinese Application No. 201080030935.4.
Search Report dated. Apr. 24, 2010 for German Application No. 10 2009 032 399.6-51.
Application filed Oct. 24, 2013 for U.S. Appl. No. 14/113,649.
Response filed May 18, 2015 to Office Action dated Nov. 18, 2014 for U.S. Appl. No. 14/113,649.
Application filed Dec. 17, 2014 for U.S. Appl. No. 14/572,998.
German Search Report dated Mar. 25, 2014 for German Application No. 202013105779-7.
Application filed Nov. 16, 2012 for U.S. Appl. No. 13/698,417.
Application filed Jun. 2, 2013 for U.S. Appl. No. 13/991,285.
English translation of application filed Aug. 13, 2013 for Application filed Jun. 2, 2013 for U.S. Appl. No. 13/991,285.
Restriction Requirement dated May 27, 2015 for U.S. Appl. No. 13/991,285.
Application filed Jan. 29, 2015 for Design U.S. Appl. No. 29/516,073.
Application filed Jan. 29, 2015 for Design U.S. Appl. No. 29/516,082.
Application filed Mar. 3, 2015, 2015 for Design U.S. Appl. No. 29/519,198.
Final Office Action dated Jul. 20, 2015 for U.S. Appl. No. 14/113,649.
Response filed Dec. 21, 2015 to Office Action dated Jul. 20, 2015 for U.S. Appl. No. 14/113,649.
Response filed Oct. 6, 2015 to Notice of Non-Compliant Amendment for U.S. Appl. No. 13/698,417.
Notice of Non-Compliant Amendment dated Aug. 10, 2015 for U.S. Appl. No. 13/698,417.
Final Office Action dated Oct. 16, 2015 for U.S. Appl. No. 13/698,417.
Extended European Search Report dated Apr. 17, 2015 for European Application No. 14004167.4.
Response to Election of Species Requirement and Amendment filed Oct. 15, 2018 from U.S. Appl. No. 15/679,482.
Chinese Search Report dated Jul. 18, 2018 for Application No. 2014103745834 filed Jul. 31, 2014.
DesignView of CN302452159 registered Jun. 5, 2013, printed Oct. 18, 2018.
Response to Restriction Requirement, filed Oct. 29, 2019, for U.S. Appl. No. 15/575,549.
Response to Final Office Action, dated Nov. 11, 2019, for U.S. Appl. No. 14/815,210, 20 pages.
Office Action, dated Nov. 20, 2019, for U.S. Appl. No. 15/575,549, 12 pages.
Office Action, dated Dec. 9, 2019, for U.S. Appl. No. 14/815,210, 6 pages.
German Search Report dated Apr. 21, 2017 for application No. 10 2016 009 957.7.
Final Office Action dated Sep. 4, 2020 for U.S. Appl. No. 15/679,533.
Restriction/Species requirement dated Dec. 7, 2020 for U.S. Appl. No. 16/524,838.
Notice of Allowance dated Apr. 18, 2016 for U.S. Appl. No. 14/572,998.
Response filed Apr. 27, 2016 to Office Action dated Jan. 29, 2016 for U.S. Appl. No. 13/380,949.
German Search Report dated Apr. 12, 2016 for related German Application No. 10 2015 008 735.5.
Notification of the First Office Action with search report dated Aug. 24, 2015 for Chinese Application No. 201280020519.5 (related to U.S. Appl. No. 14/113,649), 13 pages.
Notification of the Second Office Action dated May 16, 2016, for Chinese Application No. 201280020519.5 (related to U.S. Appl. No. 14/113,649), 5 pages.
Japanese Office Action for JP2014-517485 (related to U.S. Appl. No. 14/113,649), dated Jul. 5, 2016, 16 pages.
International Search Report dated Apr. 12, 2019 for PCT/DE2018/100679 filed Aug. 1, 2018.
Written Opinion for PCT/DE2018/100679 filed Aug. 1, 2018.

(56) References Cited

OTHER PUBLICATIONS

Office Action dated Dec. 31, 2015 for U.S. Appl. No. 14/572,998.
Notice of Allowance dated Jan. 19, 2016 for Design U.S. Appl. No. 29/539,615.
Notice of Allowance dated Jan. 22, 2016 for U.S. Appl. No. 13/991,285.
International Search Report (dated Jun. 20, 2008), Written Opinion (dated Jun. 20, 2008), and International Preliminary Report on Patentability (dated Sep. 14, 2010) from PCT/US2008/03318 filed Mar. 12, 2008.
Response filed Dec. 7, 2015 to Office Action dated Aug. 7, 2015 for U.S. Appl. No. 13/991,285.
European Search Report dated May 8, 2017 for Application No. EP16203544.
"Spray Guns/sata.com", Oct. 18, 2015, XP055364928 URL:http://web.archive.org/web/20151018205307/http://www.sata.com/index.php?id=lackierpistolen&L=11 [gefunden am Apr. 13, 2017]; reprinted on Dec. 8, 2017.
"SATAjet 5000 B Lackierpistolen | Bechersysteme | Atemschutz | Filtertechnik | Zubehor So flexibel wie Ihre Aufgaben" Apr. 11, 2017, XP055364477 Gefunden im Internet: URL:https/www.sata.com/uploads/tx_pxspecialcontent/00_SATAjet_5000_B.pdf [gefunden am Apr. 12, 2017]; English translation of full brochure attached.
Amendments submitted to European Patent Office dated Dec. 3, 2017 for Application No. EP16203544 (with English translation of chart on p. 3).
Response to Office Action dated Mar. 9, 2020 for U.S. Appl. No. 14/815,210.
Notice of Allowance for U.S. Appl. No. 14/815,210 dated Mar. 25, 2020.
Office Action of U.S. Appl. No. 15/679,461 dated Mar. 31, 2020.
Reply to Office Action filed Oct. 11, 2019 for U.S. Appl. No. 15/679,461.
Notice of Allowance dated Jan. 27, 2016 for Design U.S. Appl. No. 29/510,723.
Office Action, dated Jan. 15, 2019, for U.S. Appl. No. 15/679,533.
Office Action, dated Jan. 15, 2019, for U.S. Appl. No. 15/679,461.
European Search Report, dated Jan. 20, 2020, for European Application No. 19183380.
Office Action dated Mar. 30, 2020, for U.S. Appl. No. 15/679,533.
Response to Office Action dated Apr. 5, 2019 for U.S. Appl. No. 15/679,461 (29 pages).
Response to Office Action dated Apr. 9, 2019 for U.S. Appl. No. 15/679,533 (22 pages).
Final Office Action dated Sep. 12, 2018 in U.S. Appl. No. 14/815,210.
European Search Report dated Jan. 24, 2018 for U.S. Appl. No. 17/186,905.
Response to Office Action filed Feb. 16, 2016 for U.S. Appl. No. 13/698,417.
Screen shot of a SATA product (SATAjet B) description retrieved on Feb. 12, 2016 from www.sata.com/index.php.
"The Hot Rolling Process;" California Steel; retrieved on Feb. 12, 2016 from http://www.californiasteel.com/GetPublicFile.aspx?id=53.
German Search Report dated Mar. 15, 2016 for Application No. 20 2015 003 664.3, 8 pages.
Chinese Search Report dated Feb. 21, 2019 for Application No. 2016800293781, 3 pages.
Final Office Action dated Aug. 12, 2019 from U.S. Appl. No. 14/815,210.
Office Action from U.S. Appl. No. 15/143,698 dated Jan. 5, 2017.
German Search Report for German Application No. 10 2015 016 474.0 dated Aug. 9, 2016, 14 pages.
Notice of Allowance in U.S. Appl. No. 29/556,463, filed Mar. 1, 2016, 9 pages.
Notice of Allowance in U.S. Appl. No. 29/555,656, filed Feb. 24, 2016, 5 pages.
Printout from Internet www.ehow.com explaining how to choose a spray gun and stating in item 2 "Nozzle sizes vary between about 1 mm and 2 mm.", printed Sep. 7, 2012 (Exhibit 1023 in IPR 2013-0111).
Printout from Internet www.bodyshopbusiness.com explaining how to choose nozzle setup in paragraph bridging pp. 1 and 2, giving general rule of thumb of nozzle sizes from 1.3 mm to 2.2 mm, depending on material being sprayed, printed Sep. 7, 2012 (Exhibit 1024 in IPR 2013-0111).
Printout from Internet of pages from brochure of Walther Pilot showing nozzle sizes for spray guns ranging from 0.3 mm to 2.5 mm, dated 2007, (Exhibit 1025 in IPR 2013-0111).
Printout from Internet www.alsacorp.com showing in the paragraph bridging pp. 2 and 3, Model VS-7200 Saber LVLP spray gun with nozzle size 1.3 mm with sizes 1.3 to 2.0 available, printed Aug. 26, 2012 (Exhibit 1026 in IPR 2013-0111).
Printout from Internet of copy of p. 28 from current 3Mtm brochure showing Tip/Nozzle/Air Cap Selection Guide with nozzle sizes from 0.5 mm to 3.0 mm., (Exhibit 1027 in IPR 2013-0111).
Decision by EPO regarding opposition proceedings to revoke patent No. 99926841.0-2425/ 1108476, corresponding to '387 patent, 2012, (Exhibit 1029 in IPR 2013-0111).
SATA News Publication Dan-Am Jul.-Sep. 1996, (Exhibit 1034 in IPR 2013-0111).
SATA News Publication Dan-Am Oct.-Dec. 1996, (Exhibit 1035 in IPR 2013-0111).
SATA News Publication Dan-Am Apr.-Jun. 1998 (Exhibit 1036 in IPR 2013-0111).
Dan-Am SATA Catalog 6 for spray guns 1991 (Exhibit 1037 in IPR 2013-0111).
Dan-Am SATA Catalog 8 for spray guns 1994 (Exhibit 1038 in IPR 2013-0111).
Dan-Am Catalog 6—51pp published 1991, (Exhibit 1042 in IPR 2013-0111).
Japanese Industrial Standards B 9809 English translation, 1992 (Exhibit 1049 in IPR 2013-0111).
Japanese Industrial Standards B 9809 revised Mar. 1, 1991 (Exhibit 1050 in IPR 2013-0111).
SATA News, vol. 21, 2009 (Exhibit 2010 in IPR 2013-0111).
Collision Hub TV Document (image from video clip) printed Oct. 9, 2013 (Exhibit 2011 in IPR 2013-0111).
MyRielsMe.com document from press release printed Oct. 9, 2013 (Exhibit 2012 in IPR 2013-0111).
How to set Air pressure, Utube screenshot printed Oct. 9, 2013 (Exhibit 2013 in IPR 2013-0111).
Ohio EPA Letty to Tony Larimer, response to letter dated Aug. 2006 (Exhibit 2014 in IPR 2013-0111).
Pinahs Ben-Tzvi et al, A conceptual design . . . , Mechatronics 17 (2007) p. 1-13 (Exhibit 2015 in IPR 2013-0111).
On line ad from Amazon.com printed Oct. 14, 2013 (Exhibit 2017 in IPR 2013-0111).
Rone et al, MEMS-Baed Microdroplet Generation with Integrated Sensing, COMSOL, 2011 (Exhibit 2018 in IPR 2013-0111).
Final Office Action dated Sep. 23, 2020, for U.S. Appl. No. 15/575,549.
May 22, 2018 Final Office Action for U.S. Appl. No. 14/113,649.
Jun. 25, 2018 Response to Office Action for U.S. Appl. No. 14/815,210.
Office Action, dated Jan. 9, 2019, for U.S. Appl. No. 15/679,482.
Office Action dated Feb. 19, 2021, for U.S. Appl. No. 15/575,549.
International Preliminary Report on Patentability with Written Opinion dated Mar. 9, 2021 for PCT/EP2019/074000 filed Sep. 9, 2019.
Office Action dated Aug. 12, 2021 for U.S. Appl. No. 15/679,533.
Office Action dated Feb. 5, 2021 for U.S. Appl. No. 16/524,740.
International Preliminary Report on Patentability, dated Mar. 9, 2021,with Written Opinion for PCT/EP2019/074000, filed Sep. 9, 2019 (English translation) (7 pages).
Notice of Allowance dated Jul. 26, 2021 for U.S. Appl. No. 15/575,549.
International Search Report dated Apr. 12, 2019 and Written Opinion for PCT/DE18/100679, filed Aug. 1, 2018 (21 pages).
German Search Report dated May 26, 2021, for DE 10 2020 123 769.3, with machine translation.

(56) References Cited

OTHER PUBLICATIONS

For U.S. Appl. No. 16/524,740: Interview Summary and Advisory Action dated Aug. 30, 2021.
Office Action dated Nov. 24, 2021 for U.S. Appl. No. 16/524,740.
International Search Report dated Nov. 13, 2019 for PCT/EP2019/074000, filed Sep. 9, 2019.
Written Opinion or PCT/EP2019/074000, filed Sep. 9, 2019.
Response filed May 5, 2021 for U.S. Appl. No. 16/524,740.
International Preliminary Report on Patentability dated Feb. 2, 2021 and Written Opinion for PCT/DE2018/100679 filed Aug. 1, 2018 (English Translation).
Notice of Allowance dated May 18, 2021 for U.S. Appl. No. 29/730,873.
Anonymous: "DeVilbiss Automotive RefinishingSpray Gun Setup", Jan. 27, 2015 (Jan. 27, 2015), XP055580418, retrieved from the Internet: URLhttps:/ /web.archive.org/web/20150127025402lhttp://www.autorefinishdevilbiss.com.spray-gun-setup.aspx.
Anonymous: "DeVilbiss—Spray Gun Tool on the AppStore", Oct. 19, 2015 (Oct. 19, 2015), XP055580448, retrieved from the Internet: URLhttps://itunes .apple.comlus/app/ devilbiss-spray-gun-tool/id590404917?mt=8.
Final Office Action dated Jun. 1, 2021 for U.S. Appl. No. 16/524,740.
Search Report dated Jan. 29, 2022, for Chinese Patent Appl. No. 201910704447X, with translation.
Final Office Action dated May 2, 2022 for U.S. Appl. No. 16/524,740.
Search Report dated Jan. 26, 2022, for Chinese Patent Appl. No. 2019107032612 with translation.
Search Report dated Jan. 7, 2022, for Chinese Patent Appl. No. 2018800961965, with translation.
Office Action dated Apr. 26, 2022 for U.S. Appl. No. 15/679,533.
Examination Report from the European Patent Office dated Nov. 23, 2021 for European Patent Application No. 19183380.5.
Examination Report from the European Patent Office dated Nov. 8, 2021 for European Patent Application No. 19183382.1.
German Search Report dated May 7, 2019 for Application No. 10 2018 122 004.9.
International Search Report and Written Opinion for PCT/EP2021/53940, filed Feb. 18, 2021.
International Search Report and Written Opinion for PCT/EP2021/054061, filed Apr. 16, 2021.
Zhu Zhifu, "Simulation and Experimental Study on Spray Characteristics of Gas-Assisted Urea Spray Gun", Aug. 6, 2019, pp. 1-6.
International Search Report and Written Opinion for PCT/EP2021/54059, filed Feb. 18, 2021.
Second Office Action, dated Aug. 12, 2022, for Chinese Application No. 2018800961965 (English translation).
Search Report, dated Aug. 1, 2022, or Chinese Application No. 2018800961965.
Notification of the Second Office Action dated Aug. 26, 2022 for Chinese Patent Application No. 2019107032612.
European Search Report dated Feb. 4, 2022 for Application No. 21191428.8.
For Chinese Application No. 201910704447.X: Search Report, dated Aug. 25, 2022 Second Office Action, dated Sep. 1, 2022.
International Preliminary Report on Patentability dated Sep. 6, 2022 with Written Opinion for PCT/EP2021/053940 (English Translation).
International Preliminary Report on Patentability dated Sep. 6, 2022 with Written Opinion for PCT/EP2021/054059 (English Translation).
International Preliminary Report on Patentability dated Sep. 6, 2022 with Written Opinion for PCT/EP2021/054061 (English Translation).
Office Action dated Mar. 29, 2023 for U.S. Appl. No. 17/264,372.
Third Office Action dated Feb. 15, 2023 for Chinese Patent Application No. 20191070444.X.
Chinese Notification of the Third Office Action dated Feb. 14, 2023 for Chinese Patent Application No. 2019107032612, 15 pages.
European Office Action dated Mar. 21, 2023 for European Patent Application No. 19 183 382.1 (12 pages).
Decision on Rejection dated Feb. 10, 2023 for Chinese Patent Application No. 2018800961965.
Search Report dated Jan. 30, 2023 for Chinese Patent Application No. 2018800961965.
For Chinese Patent Application No. 2019800593031 First Office Action dated Apr. 25, 2022 (Eng. translation) Chinese Search Report dated Apr. 19, 2022.
Office Action dated Feb. 24, 2023 for U.S. Appl. No. 16/524,740.
Office Action dated Dec. 2, 2022 for U.S. Appl. No. 16/524,838.
Final Office Action dated Nov. 23, 2021 for U.S. Appl. No. 15/679,533.

* cited by examiner

NOZZLE FOR A SPRAY GUN, NOZZLE SET FOR A SPRAY GUN, SPRAY GUNS AND METHODS FOR PRODUCING A NOZZLE FOR A SPRAY GUN

FIELD OF THE DISCLOSURE

The disclosure relates to: a nozzle for a spray gun, in particular a paint spray gun; a nozzle set for a spray gun, in particular a paint spray gun; a spray gun, in particular a paint spray gun; a method for producing a nozzle for a spray gun, in particular a paint spray gun; and a method for producing a nozzle for a spray gun, in particular a paint spray gun.

BACKGROUND

Spray guns, in particular paint spray guns, operate with different pressurization methods. Conventional spray guns operate at relatively high spray pressures of several bar. In what are referred to as HVLP guns, the internal nozzle pressure is at maximum 10 psi or 0.7 bar, as a result of which transmission rates of far more than 65% are achieved. Compliant spray guns in turn have an internal nozzle pressure of more than 10 psi or 0.7 bar, but likewise achieve a transmission rate of more than 65%.

The internal nozzle pressure of the spray gun is understood as meaning the pressure which prevails in the air cap of the spray gun. The atomizer-air region is frequently separated here from the horn-air region, and a different pressure can prevail in the atomizer-air region than in the horn-air region. However, the pressures in the atomizer-air region and in the horn-air region can also be identical. The internal nozzle pressure can be measured, for example, with what is referred to as a test air cap. This is a special air cap which is arranged on the spray gun instead of the customary air cap.

The test air cap generally has two manometers, one of which is connected to the atomizer-air region via a bore in the test air cap and the other is connected to the horn-air region via a further bore in the test air cap.

According to the prior art, the head of a spray gun, in particular paint spray gun, in particular compressed-air-atomizing paint spray gun has a paint nozzle which is screwed into the gun body. The front end of the paint nozzle frequently has a hollow-cylindrical spigot, from the front mouth of which the material to be sprayed emerges during the operation of the spray gun. However, the front region of the paint nozzle can also be configured conically. As a rule, the gun head has an external thread, via which an air nozzle ring having an air cap arranged therein is screwed onto the gun head. The air cap has a central opening, the diameter of which is larger than the outer diameter of the paint nozzle spigot or the outer diameter of the front end of a conical paint nozzle. The central opening of the air cap and the spigot or the front end of the paint nozzle together form an annular gap. What is referred to as atomizer air emerges from said annular gap and, in the above-described nozzle arrangement, generates a vacuum on the end surface of the paint nozzle, as a result of which the material to be sprayed is sucked out of the paint nozzle. The atomizer air impinges on the paint jet, thus causing the paint jet to be torn into strands and strips. Their hydrodynamic instability, the interaction between the rapidly flowing compressed air and the ambient air and aerodynamic malfunctions cause said strands and strips to integrate to form droplets which are blown away from the nozzle by the atomizer air.

The air cap frequently furthermore has two horns which are diametrically opposite each other and protrude over said annular gap and the material outlet opening in the outflow direction. Two supply bores, i.e. horn-air supply ducts, run from the rear side of the air cap to horn-air bores in the horns. As a rule, each horn has at least one horn-air bore, but each horn preferably has at least two horn-air bores from which the horn air emerges. The horn-air bores are generally oriented in such a manner that they point toward the nozzle longitudinal axis in the outlet direction downstream of the annular gap, and therefore the "horn air" emerging from the horn-air bores can influence the air which has already emerged from the annular gap or the paint jet or the paint mist which has already been at least partially produced. As a result, the paint jet or else spray jet having an originally circular cross section (round jet) is compressed on its sides facing the horns and extended in a direction perpendicular thereto. This gives rise to what is referred to as a wide jet which permits a greater surface-painting speed. In addition to the deformation of the spray jet, the horn air brings about further atomization of the spray jet.

Air ducts are generally introduced in the gun body, i.e. the main body of the spray gun, wherein air from one of the ducts is directed, as described above, to said annular gap for use as atomizer air, and air from another duct is directed, as described above, to said horn-air openings for use as horn air. For this purpose, the air ducts open in an end surface of the head of the gun body and are directed to the annular gap or to the horn-air bores via an air-distributor arrangement. The air-distributor arrangement frequently comprises an air distributor ring which separates the atomizer-air region and the horn-air region from each other. Such a nozzle arrangement or air-distributor arrangement is disclosed, for example, in DE 20 2010 012 449 U1 and in Chinese utility model documents ZL 2014 2 0431026.7 and ZL 2016 2 0911120.1.

A disadvantage of the above-described prior art, namely the air-distributor arrangement having an air-distributor ring, is that the air distributor ring has to be produced as a separate component by the manufacturer of the spray gun and has to be fitted by the manufacturer or by the user of the spray gun. The user has to clean and change the separate component. Furthermore, there is the risk of losing the air-distributor ring, which makes the spray gun unusable until the user has acquired a replacement. In order to achieve simple sealing between the atomizer-air region and horn-air region, the air distributor ring is produced from plastic. As a result, however, it is susceptible to damage. Furthermore, the air-distributor rings according to the prior art are of relatively complex configuration.

US 2007/0262169 A1 cites Taiwanese utility model document TW 510253 which discloses a gun head structure, wherein the gun head discloses two annular grooves which are bounded by three encircling walls on the gun head. The described nozzle structure comprises a sealing disk b, a connection part c, a nozzle d, a spray head e and a screw nut f.

Both the gun head structure according to the prior art cited in the US document and the arrangement described in said US document itself comprise a multiplicity of individual parts having the disadvantages described above. Some of the individual components have a relatively filigree configuration. If one of the components is damaged, there is the risk that sealing between the atomizer-air region and horn-air region is already no longer provided, which has a negative influence on the spray jet. Furthermore, the gun head is relatively long because of the multiplicity of components fitted on one another.

The same advantages emerge from the solution disclosed in EP 0 846 498 A1. The nozzle of the spray gun described there is constructed from a plurality of individual parts, in particular a paint nozzle having a disk element which is arranged integrally thereon and extends from the paint nozzle in the radial direction, a separating ring which is placed onto the main body of the spray gun before the paint nozzle is arranged on the main body, wherein the disk element of the paint nozzle rests on the separating ring in the fitted state, and wherein a separate sealing ring is arranged between the paint nozzle and the separating ring.

SUMMARY

One aspect of the disclosure therefore relates to a nozzle for a spray gun, in particular a paint spray gun, a nozzle set for a spray gun, in particular a paint spray gun, and a spray gun, in particular a paint spray gun, which are all functionally reliable.

Another aspect of the disclosure relates to an efficient method for producing a nozzle for a spray gun, in particular a paint spray gun.

In an embodiment, a nozzle for a spray gun, in particular a paint spray gun, has at least one material nozzle having a hollow portion for the passage of the material to be sprayed and a material outlet opening, and also has a disk element extending radially from the material nozzle, wherein the disk element has at least one passage opening, wherein the nozzle has at least one first baffle disk which is arranged, in particular is arranged captively, on the disk element and has an inner and an outer circumference, and wherein the first baffle disk is arranged on the disk element directly, in particular without a sealing element arranged inbetween.

The fact that the baffle disk can be arranged "captively" on the nozzle means here that the baffle disk cannot be removed or cannot be removed without relatively great effort from the nozzle, and the removal is not envisaged. For example, the baffle disk can be adhesively bonded, riveted or welded to the material nozzle. A strong snap-in connection or strong screw connection can also render the baffle disk "captive". The first baffle disk is particularly preferably pressed to the nozzle. An advantage of this configuration is that the user of the spray gun in which the nozzle according to the disclosure can be installed cannot lose the baffle disk. The disk element and the first baffle disk are connected directly to each other, i.e. the surfaces of the disk element and of the first baffle disk lie directly against each other in the connecting region. A sealing element which is separate or is arranged on one of the components, in particular is arranged fixedly, in particular injection-moulded thereon, can be dispensed with. The connection between the disk element and the first baffle disk is preferably configured to be substantially air-impermeable. This means that the air which impinges on the one side of the connection or of the connecting region cannot flow between the disk element and the first baffle disk. The intention at least is that the connection between the disk element and the first baffle disk is air-impermeable in such a manner that no relevant portion of air impinging on the connecting region flows between the disk element and the first baffle disk. The passage of small amounts which do not have any influence on the atomization during the operation of the spray gun are insignificant. Preferably, however, the region is fully air-impermeable. The disk element and the first baffle disk can also be configured integrally, as a result of which the first baffle disk can likewise be arranged captively on the nozzle, and the connection between the disk element and the the first baffle disk can be configured to be substantially air-impermeable. However, the disk element and the baffle disk are preferably configured as separate components.

Neither the disk element nor the baffle disk have to be configured cylindrically nor do they have to have a circular area. On the contrary, their width and length are merely greater by a multiple than their thickness. Otherwise, both in the case of the disk element and in the case of the baffle disk, the lower side can in each case have a different shape than the upper side, they can have different thicknesses at different points, they can have constrictions or extensions, they can have an elliptical or otherwise ovally shaped upper or lower side, or else can be configured in an angular manner as small plates. Furthermore, they can be provided with openings or grooves or can be equipped with or connected to further components. Preferably, however, the disk element is configured as a disk or ring with a circular area which is arranged concentrically about the nozzle or material nozzle. As a result, simple production of the nozzle and disk element unit is possible by means of turning. The same is true of the baffle disk. Both the disk element and the baffle disk can act as restrictors which, for example, restrict the flow region of air. Alternatively or additionally, the two components can act as an air-deflecting element or air-directing element. They can be used in particular for homogenizing an air flow or a plurality of air flows. They can serve to distribute an air flow or a plurality of air flows emerging from an air outlet opening or from a plurality of air outlet openings over a relatively large region such that the air flow is present less in a punctiform manner and instead in a more extensive manner. Exemplary embodiments for the components and the function thereof will be explained in more detail further below.

The disk element and the nozzle or the material nozzle can be configured integrally, i.e. they have been manufactured together from a single piece, for example by means of casting, machining, 3D printing or other methods. This means that the nozzle and the disk element do not have to be manufactured separately from each other and subsequently have to be connected to each other. They are preferably produced by turning. The disk element preferably has a plurality of passage openings, particularly preferably seven to thirteen, distributed over the circumference.

In an embodiment, a nozzle set for a spray gun, in particular a paint spray gun, has at least one nozzle described above and in more detail further below, wherein the nozzle set furthermore has an air cap with a central opening and at least one, preferably two, diametrically opposite horn-air bores.

The explanations above and below with respect to the nozzle apply correspondingly to the nozzle set according to the disclosure. In addition to a nozzle, the nozzle set has at least one air cap which can be configured as described at the beginning and can carry out the functions described above.

In an embodiment, a spray gun, in particular a paint spray gun, has at least one main body and a nozzle, in particular a nozzle described above and in more detail further below, with a first baffle disk, wherein the first baffle disk is arranged downstream of at least one radially outer air outlet opening in the main body in the direction of the nozzle longitudinal axis and is spaced apart from the at least one radially outer air outlet opening in the axial direction and at least partially projects over an at least one radially outer air outlet opening in the radial direction. "Axial direction"

should likewise be understood as meaning a direction along the nozzle longitudinal axis. The air flowing out of the at least one, preferably two radially outer air outlet openings in the main body, said air preferably being the horn air, thereby impinges on the first baffle disk and is restricted, and distributed over the circumference of the first baffle disk and homogenized.

In another embodiment, a spray gun, in particular a paint spray gun, has at least one main body and a nozzle set, in particular a nozzle set described above and in more detail further below, wherein the main body has at least one radially outer air outlet opening, in particular two radially outer air outlet openings, at least one radially inner air outlet opening, in particular two radially inner air outlet openings, and a middle wall lying inbetween, and the nozzle set has at least one air cap with at least one horn-air supply duct, at least one horn-air bore and at least one central opening, wherein the nozzle set furthermore has a nozzle, in particular a nozzle described above and in more detail further below, with a first baffle disk having an inner circumference and an outer circumference and a disk element having at least one passage opening, wherein the spray gun, has at least one first air flow path which runs from the at least one radially inner air outlet opening, past the inner circumference of the first baffle disk, through the at least one passage opening of the disk element, into an air-cap chamber formed by the air cap and the nozzle, and through a gap which is formed by a front region of the nozzle and the central opening in the air cap, and/or wherein the spray gun has at least one second air flow path which is separated from the first air flow path and which runs from the at least one radially outer air outlet opening, past the outer circumference of the first baffle disk, past an outer circumference of the disk element, into the at least one horn-air supply duct in the air cap and through the at least one horn-air bore.

The above explanations with regard to the nozzle apply correspondingly to the spray guns according to the disclosure. In addition to a nozzle, the spray guns have at least one main body and preferably an air cap, which can both be configured as described at the beginning and can both carry out the functions described above. Of course, the spray guns according to the disclosure can have further components known in the prior art, for example a compressed-air connection, a paint needle, a trigger guard for opening an air valve and for moving the paint needle out of the material outlet opening of the material nozzle, a fan control for adjusting the ratio of atomizer air and horn air in order to shape the paint jet, an air micrometer for adjusting the spray pressure, a material-quantity-regulating device for adjusting the maximum volumetric flow of material, a material connection, paint ducts for directing the material to be sprayed from a material inlet to the material outlet, a hanging hook, an air nozzle ring for attaching the air cap to the main body and/or an an analogous or digital pressure-measuring device. The main body, which may also be referred to as the gun body, can comprise at least one handle and an upper gun body.

By means of the described configurations of the nozzle according to the disclosure, the nozzle set according to the disclosure and the paint spray guns according to the disclosure, separate sealing means or sealing elements, such as, for example, sealing rings, can be dispensed with. The disadvantages that separate sealing elements have to be specially produced, and may become lost or damaged, can thereby be avoided, and the nozzle according to the disclosure, the nozzle set according to the disclosure and the paint spray nozzles according to the disclosure are functionally reliable and have only few individual parts and a compact design. Furthermore, they are quieter than nozzles, sets of nozzles and paint spray guns according to the prior art, which is achieved in particular by the changed air flow paths.

In another embodiment, an efficient method for producing a nozzle for a spray gun, in particular a paint spray gun, is achieved by a method for producing a nozzle for a spray gun, in particular a paint spray gun, in particular a nozzle described above and more precisely further below, wherein the nozzle has at least one material nozzle having a hollow portion for the passage of the material to be sprayed and a material outlet opening, and also a disk element extending radially from the material nozzle, wherein the disk element has at least one passage opening, wherein the method comprises, at least as one step, arranging, in particular captively arranging, in particular pressing, a first baffle disk and a second baffle disk onto the material nozzle and/or onto the disk element, wherein the first baffle disk and the second baffle disk are arranged on the material nozzle and/or on the disk element in such a manner that the second baffle disk is arranged on that side of the first baffle disk which faces away from the material outlet opening and is spaced apart in the axial direction from the at least one passage opening in the disk element and at least partially projects over the at least one passage opening in the radial direction. "Axial direction" is understood here as meaning a direction along the nozzle longitudinal axis.

In another embodiment, the disclosure relates to a method for producing a nozzle for a spray gun, in particular a paint spray gun, in particular a nozzle described above and more precisely further below, wherein the nozzle comprises at least one material nozzle having a hollow portion for the passage of the material to be sprayed and a material outlet opening, and a disk element which is arranged on the material nozzle, in particular is arranged integrally thereon, and which has at least one passage opening, where the nozzle also has a first baffle disk with a second baffle disk connected integrally thereto, wherein the second baffle disk is arranged on that side of the first baffle disk which faces away from the material outlet opening, and is spaced apart in the axial direction from the at least one passage opening in the disk element and at least partially projects over the at least one passage opening in the radial direction, wherein the nozzle is produced integrally by means of 3D printing. "Axial direction" should also be understood here as meaning a direction along the nozzle longitudinal axis.

The advantage of production by means of 3D printing resides in particular in the fact that the entire nozzle can be produced in a single step. During the production by means of machining, such as turning or milling and subsequent boring, the component has to be inserted into different tools or machines and removed again after the machining. Furthermore, 3D printing makes it possible to produce shapes which can only be realized with difficulty, if at all, using conventional manufacturing methods, for example undercuts. In addition, virtually no material waste occurs. The nozzle produced by means of 3D printing can be produced in particular from plastic or from metal.

Advantageous refinements are also disclosed.

The first baffle disk of the nozzle according to the disclosure is preferably configured from continuous material between its inner circumference and its outer circumference, in particular said baffle disk does not have any passage openings. This means that air which impinges on the region between the inner circumference and the outer circumference of the first baffle disk cannot penetrate or flow through the first baffle disk. The intention is at least for the region to be air-impermeable in such a manner that no relevant portion of air which impinges on the region flows through the first baffle disk. The passage of small amounts which do not have any influence on the atomization during the operation of the spray gun are insignificant. Preferably, however, the region is completely configured from continuous material. The air which impinges on the region or the surface is therefore forced to be distributed over the circumference of the baffle disk and to flow through a gap, described more accurately further below, between the first baffle disk and an outer wall of the main body of the spray gun. As a result, the first baffle disk can act as a restrictor which restricts the flow region of the air. In addition, it can act as an air-deflecting element or air-directing element. It can serve in particular for homogenizing the air flow or the air flows. Furthermore, the air flow or the air flows emerging from an air outlet opening or from a plurality of air outlet openings in the main body of the spray guns and impinging on the first baffle disk is thereby distributed over a greater region, and therefore the air flow is present less in a punctiform manner and instead in a more extensive manner. However, the first baffle disk can have grooves or other depressions between their inner circumference and their outer circumference.

The disk element preferably has at least two, in particular at least three, contact surfaces, in particular contact surfaces arranged substantially at right angles to one other, and the first baffle disk likewise has at least two, in particular at least three, contact surfaces, in particular contact surfaces arranged substantially at right angles to one another, wherein the contact surfaces of the first baffle disk lie at least in regions against the contact surfaces of the disk element. The contact surfaces do not have to be joined together, but rather can be separated from one another, for example by grooves. Two or more contact surfaces which lie against two or more mating contact surfaces are advantageous in order to be able to configure the connection, i.e. the contact region, between the disk element and the first baffle disk to be substantially air-impermeable. If there are only two contact surfaces lying against each other between two metal components, undesirable ducts may exist between the two components because of the manufacturing, in particular because of tolerances and/or because of microstructures on the metal surface, through which ducts air can flow. In the case of a plurality of contact surfaces, the probability of a continuous duct forming is smaller than in the case of just one contact surface. In particular, a connection with contact surfaces arranged at right angles to one another is difficult for air to penetrate. For this purpose, the first component has a stepped region which corresponds to a corresponding stepped region of the second component. An outer diameter of the one component can correspond to the inner diameter of the region bearing thereagainst of the other component, or the outer diameter can be somewhat larger in order to achieve a press fit. Such a press fit is likewise conducive to the air tightness of the connection between the disk element and the first baffle disk.

A surface of the first baffle disk, said surface facing away from the material outlet opening, is preferably set back along an axis in relation to a surface of the disk element, said surface facing away from the material outlet opening. The axis along which that surface of the first baffle disk which faces away from the material outlet opening is set back in relation to a surface of the disk element, said surface facing away from the material outlet opening, here is the central or longitudinal axis of the nozzle. “At the front” is considered here to be the spray direction or the side of the material outlet opening of the nozzle, and “at the rear” to be the opposite side or opposite direction. The fact that a surface of the first baffle disk, said surface facing away from the material outlet opening, is set back along an axis in relation to a surface of the disk element, said surface facing away from the material outlet opening, means that a surface of the disk element, said surface facing away from the material outlet opening, is arranged further at the front, i.e. closer in the axial direction to the material outlet opening, than a surface of the first baffle disk, said surface facing away from the material outlet opening. As a result, additional space for the distribution of air can be provided between said surface of the first baffle disk and said surface of the disk element.

The first baffle disk of the nozzle according to the disclosure preferably has a greater outer extent than the disk element. This makes it possible to position the first baffle disk within the head region of the main body of a spray gun, in particular within an outer wall described in more detail further below, in particular in such a manner that the first baffle disk forms a gap together with the outer wall, while the disk element can be arranged at least in regions within an air cap having smaller dimensions or, together with an air cap dimensioned similarly to the outer wall, can form a larger gap than the first baffle disk with the outer wall, or can lie against a part of the air cap with a smaller diameter.

The first baffle disk or the disk element, preferably both, particularly preferably each have a circular outer circumference and are arranged concentrically with respect to each other. The production by means of turning and a uniform distribution of air over the circumference are thereby made possible.

The disk element preferably has at least one first surface facing away from the material outlet opening and a second surface facing away from the material outlet opening, wherein said first surface and second surface are connected in a stepped manner to each other via a third surface. This means that the three surfaces form a step. The step on the disk element preferably forms contact surfaces against which mating contact surfaces of the baffle disk, in particular of the first baffle disk, lie, i.e. the baffle disk is arranged on the disk element, in particular pressed thereon, in the region of the step. The baffle disk can likewise preferably have a stepped configuration in the contact region.

The disk element, in particular a surface of the disk element, said surface facing away from the material outlet opening, particularly preferably has a groove. The groove permits or facilitates the pressing of the baffle disk onto the disk element. Without the groove, at the point at which the groove is introduced, a radius would be present between the adjacent surfaces, which would prevent the baffle disk from being pressed onto the disk element.

The end of the nozzle that faces away from the material outlet opening preferably has an external thread for fastening in or to a main body, and/or a sealing element. The sealing element serves in particular for sealing a material-guiding region of an air-guiding region of the spray gun. The manner of operation of such a sealing element, which is also referred to as a nozzle seal, is explained further below. The nozzle seal is preferably composed of plastic and is preferably connected exchangeably to the nozzle, in particular the material nozzle.

In addition to the first baffle disk, the nozzle particularly preferably has at least one second baffle disk which is arranged on that side of the first baffle disk which faces away from the material outlet opening, which is spaced apart in the axial direction from the at least one passage opening in the disk element and which at least partially projects over the at least one passage opening in the disk element in the radial direction. Such a second baffle disk is advantageous in particular for low-pressure nozzles, in particular HVLP nozzles, since the second baffle disk permits further restriction of the air flow and contributes to the required limiting of the internal nozzle pressure to a maximum of 10 psi or 0.7 bar.

The terms low-pressure nozzle and—as explained further below—high-pressure nozzle are not intended here to mean that the respective nozzle is used only in classic low-pressure or high-pressure spray guns or that, by means of the use of the restriction nozzle, the spray gun becomes a classic low-pressure spray gun, in particular a HVLP spray gun, or a classic high-pressure gun. On the contrary, they should be understood as meaning only that the spray gun, when equipped with the high-pressure nozzle, has a higher internal nozzle pressure than if it is equipped with the low-pressure nozzle. The spray gun equipped with the low-pressure nozzle or the main body equipped with the low-pressure nozzle preferably meets the criteria of an HVLP spray gun, and the spray gun equipped with the high-pressure nozzle described further below or the main body equipped with the high-pressure nozzle meets the criteria of a compliant spray gun.

The second baffle disk particularly preferably has a smaller outer extent than the first baffle disk. As a result, when a nozzle is arranged in or on a main body of a spray gun, the first baffle disk can be arranged in the axial direction over at least one radially outer air outlet opening in the main body, while the second baffle disk can be arranged in the axial direction over at least one radially inner air outlet opening in the main body, wherein the radially inner air outlet opening is arranged further on the inside in the radial direction than the radially outer air outlet opening. The radially outer air outlet opening in the main body can be, for example, a horn-air outlet opening, and the radially inner air outlet opening can be an atomizer-air outlet opening. The main body preferably has two horn-air outlet openings and two atomizer-air outlet openings. Particularly preferably, in the view from the front of the head region of the main body, the two horn-air outlet openings and the two atomizer-air outlet openings each lie next to one another and a horn-air outlet opening lies in each case below an atomizer-air outlet opening.

On its side facing away from the material outlet opening, the disk element preferably has a recess or a groove in which the passage openings are arranged. This increases the distance between that side of the disk element which faces away from the material outlet opening and that side of the second baffle disk which faces said side, and the air which flows into said region has more volume available in order to be distributed.

The second baffle disk preferably has a circular outer circumference and is arranged concentrically with respect to the first baffle disk and/or with respect to the disk element. The second baffle disk and the first baffle disk and/or the disk element can as a result be turned in a simple manner as a single part. However, they can also turned as separate parts and connected to one another. Furthermore, the circular outer circumference and the concentricity ensure a uniform distribution of the air.

The first baffle disk and the second baffle disk are preferably configured integrally, in particular are turned from a single piece. However, they can also be configured to be connectable to each other, preferably captively. In particular, they can be pressed together and together can be pressed onto the nozzle, or the first baffle disk is first of all pressed onto the nozzle before the second baffle disk is pressed onto the first baffle disk. However, the nozzle and first baffle disk can also be configured integrally, and the second baffle disk can be pressed onto the unit. The abovementioned advantages with respect to integrity and captivity apply correspondingly here.

The outer diameter of the first baffle disk is preferably between 29.0 mm and 30.5 mm, in particular approximately 29.7 mm, and/or the outer diameter of the second baffle disk is between 20.0 mm and 21.5 mm, in particular approximately 20.6 mm. The outer diameter of the first baffle disk is generally preferably 1.3 to 1.6 times the size of the outer diameter of the second baffle disk.

The nozzle preferably has an air-directing disk which is arranged downstream of the at least one passage opening of the disk element in the direction of an axis, in particular the nozzle longitudinal axis. Said air-directing disk can carry out the same or similar functions as the baffle disk, in particular further restriction of the air flow can be achieved. The air-directing disk can preferably be connectively captively to the nozzle, in particular the material nozzle, in particular can be pressed thereon.

The described nozzle with the second baffle disk, the air-directing disk and/or the same dimensions of first baffle disk and/or second baffle disk is particularly suitable for use as a low-pressure or HVLP nozzle or in a low-pressure or HVLP spray gun since the air is restricted relatively strongly by said configuration.

By contrast, in addition to or instead of the second baffle disk, the nozzle can have, on the first baffle disk, an outer collar which is arranged on that side of the first baffle disk which faces away from the material outlet opening, and which is arranged on the outer circumference of the first baffle disk, and/or an inner collar which is arranged on that side of the first baffle disk which faces away from the material outlet opening and which is arranged on the inner circumference of the first baffle disk. The nozzle or the first baffle disk can have either only the outer collar, only the inner collar or both the outer collar and the inner collar. The inner collar and/or the outer collar can temporarily prevent the air impinging on the first baffle disk from flowing away directly inwards or outwards over the edge of the first baffle disk. Instead, a temporary limitation of the air in the radial direction takes place, and therefore the air is distributed in the circumferential direction over the circumference of the first baffle disk. A good distribution of air is advantageous for good atomization of the material to be sprayed or for a uniformly shaped spray jet.

The outer collar preferably has at least one oblique surface. This constitutes in particular an air-directing surface for the air which flows from the region between the outer and inner collar outwards in the radial direction towards the outer circumference of the first baffle disk.

In this exemplary embodiment, the outer diameter of the first baffle disk is preferably between 30.0 mm to 31.5 mm, in particular approximately 30.8 mm.

This nozzle with the outer and/or inner collar and the abovementioned dimensions of the first baffle disk is particularly suitable for use as a high-pressure or compliant nozzle or in a high-pressure or compliant spray gun. Said nozzle preferably does not have a second baffle disk and any air-directing disk, and therefore in particular the atomizer air is not as greatly restricted as in the case of a nozzle with a second baffle disk, which can lead to a higher internal nozzle pressure. Also in this embodiment, the disk element particularly preferably has on its side facing away from the material outlet opening a recess or a groove in which the passage openings are arranged. In the installed state of the nozzle, this causes an increase in the distance between that side of the disk element which faces away from the material outlet opening and the first front surface of the head region of the main body, and the air which flows into said region has more volume available in order to be distributed.

In all of the exemplary embodiments, the outer diameter of the disk element is preferably between 24.0 mm and 26.0 mm, in particular approximately 25.0 mm.

In addition to the components mentioned further above, the nozzle set according to the disclosure preferably furthermore has a needle for closing the material outlet opening of the nozzle. The air cap, the paint nozzle and the needle, which is also referred to as a paint needle, are the most important components for the quality of the spray jet and are frequently subject to the greatest amount of wear. It is therefore advantageous to provide a set in the form of the nozzle set according to the disclosure, which comprises said most important and most greatly stressed components. Furthermore, said components have to be readily coordinated with one another. The nozzle set according to the disclosure can furthermore comprise an air nozzle ring for attaching the air cap to a main body of a spray gun.

A spray gun according to the disclosure preferably has, in addition to the first baffle disk, a second baffle disk, wherein the second baffle disk is arranged downstream of at least one radially inner air outlet opening in the main body in the direction of the nozzle longitudinal axis and is spaced apart from the at least one radially inner air outlet opening in the axial direction and at least partially projects over the at least one radially inner air outlet opening in the radial direction. The air which flows out of the at least one, preferably two, radially inner air outlet openings in the main body and which is preferably the atomizer air thereby impinges on the second baffle disk and is restricted, distributed over the circumference of the second baffle disk and homogenized.

The main body of a spray gun according to the disclosure preferably has at least one outer wall and a middle wall, wherein the first baffle disk has an outer collar, wherein the first baffle disk, in particular the outer collar of the first baffle disk, forms a gap together with the outer wall of the main body, and/or that the first baffle disk has an inner collar which is arranged in the radial direction directly next to the middle wall of the main body, in particular directly next to an inner surface of the middle wall of the main body. The collar, in particular the outer collar, can have the above-described disadvantages, and/or the collars, in particular the inner collar, can serve for the alignment, in particular the coaxial alignment, of the nozzle in relation to the main body.

In the case of a spray gun according to the disclosure, in particular in the case of the spray gun according to the disclosure with the first air flow path described and the second air flow path described, the sealing between the first first air flow path and the second air flow path preferably takes place by means of at least part of the air cap, the disk element, the first baffle disk and the middle wall of the main body of the spray gun. By means of the configuration described, a separation or sealing between the first air flow path, which may also be referred to as first air-guiding region, and the second air flow path, which may also be referred to as second air-guiding region, is possible only with parts which are already present, i.e. parts which also carry out a different function than the separation of the two regions. No additional sealing element is necessary, and therefore the number of individual parts can be kept low so as to overcome the abovementioned disadvantages and to realize the abovementioned advantages. The air which flows along the first air flow path and which is used for atomizing material to be sprayed is frequently referred to as atomizer air. The air which flows along the second air flow path and which is used for influencing a spray jet is frequently referred to as horn air. The first air-guiding region is frequently referred to as atomizer-air region, the second air-guiding region as horn air region. Of course, the other spray guns according to the disclosure can also have a first air flow path and a second air flow path which can be configured in precisely the same manner as or similarly to the air flow paths described.

The spray gun according to the disclosure or the nozzle thereof can preferably have at least one second baffle disk which is arranged in the first air flow path. The second baffle disk can have the functions and advantages already described above.

Within the scope of a method according to the disclosure for producing a nozzle, when the first baffle disk and the second baffle disk are arranged on the material nozzle and/or on the disk element, a surface of the disk element, said surface facing away from the material outlet opening, preferably forms a stop for the first baffle disk and/or the second baffle disk. Therefore, no tolerances have to be taken into consideration in the arrangement, and instead the first baffle disk and the second baffle disk are, for example, pushed, screwed or preferably pressed onto the material nozzle or the disk element as far as possible, as far as the stop.

Before the first baffle disk and the second baffle disk are arranged on the material nozzle and/or on the disk element, the first baffle disk and the second baffle disk are preferably manufactured integrally. The integral manufacturing can take place, for example, by turning or casting or by means of 3D printing. The integrity has the advantages already described above.

The methods according to the disclosure for producing a nozzle can comprise, as further steps, arranging the nozzle in or on a main body and/or supplying the nozzle or the main body equipped with the nozzle or a spray gun equipped with the nozzle to a customer and/or using the nozzle, the main body equipped with the nozzle or the spray gun equipped with the nozzle.

The statements regarding the nozzle according to the disclosure, the nozzle set according to the disclosure, the spray guns according to the disclosure, the methods according to the disclosure for producing a nozzle and in particular the statements regarding the components can apply comprehensively, i.e. the statements regarding the nozzle according to the disclosure can also apply to the nozzle set according to the disclosure, to the first spray gun according to the disclosure, the second spray gun according to the disclosure or to the methods according to the disclosure, or vice versa, etc.

With the spray guns according to the disclosure, in particular paint spray guns, spray guns which are equipped with the nozzle according to the disclosure, spray guns which are equipped with the nozzle set according to the disclosure and spray guns which are equipped with a nozzle, which have been produced by means of the methods according to the disclosure for producing a nozzle, not only paint, but also adhesive or varnish, in particular a base coat and clear varnish, both based on a solvent and based on water, can be sprayed, as can liquids for the foodstuff industry, wood protection agents or other liquids. The spray guns mentioned can be in particular a hand-held spray gun or an automatic or robotic spray gun. Hand-held spray guns are used above all by tradesmen, in particular painters, joiners and varnishers. Automatic and robotic spray guns are generally used in conjunction with a painting robot or a painting machine for industrial application. However, it is entirely conceivable also to integrate a hand-held spray gun in a painting robot or in a painting machine.

The present disclosure can be used for all types of spray guns, but in particular for air-atomizing, in particular for compressed-air-atomizing, spray guns.

Spray guns which can include the present disclosure can have in particular the following further components, or can be equipped therewith: a handle, an upper gun body, a compressed air connection, a paint needle, a trigger guard for opening an air valve and for moving the paint needle out of the material outlet opening of the material nozzle, a fan control for adjusting the ratio of atomizer air and horn air in order to shape the paint jet, a micrometer for adjusting the spray pressure, a material-quantity-regulating device for adjusting the maximum volumetric flow of material, a material connection, paint ducts for directing the material to be sprayed from a material inlet to the material outlet opening, a hanging hook and/or an analogue or digital pressure-measuring device. However, they can also have further components from the prior art. The spray guns can be configured as a gravity cup gun having a paint cup which is arranged above the gun body and from which the material to be sprayed flows substantially by gravity and by negative pressure at the front end of the material nozzle into and through the paint ducts. The spray guns can, however, also be a side cup gun, in which the paint cup is arranged laterally on the gun body, and in which the material is likewise supplied by gravity and by negative pressure at the front end of the material nozzle of the gun. However, the spray guns can also be in the form of suction or hanging cup guns with a paint cup which is arranged below the gun body and from which the material to be sprayed is sucked out of the cup substantially by means of negative pressure, in particular by using the Venturi effect. Furthermore, they can be configured as pressurized cup guns, in which the cup is arranged below, above or laterally on the gun body and is pressurized, whereupon the material to be sprayed is forced out of the cup. Furthermore, the spray gun can be a pressure-vessel gun, in which the material to be sprayed is supplied from a paint container by means of a hose or via a pump of the spray gun.

BRIEF DESCRIPTION OF THE DRAWINGS

The disclosure will be explained in more detail below by way of example with reference to the following figures, in which.

DETAILED DESCRIPTION

Figure 1:
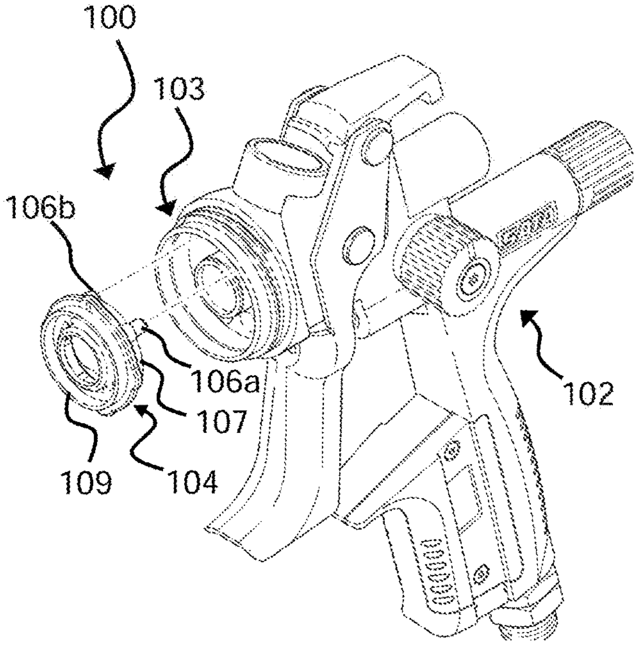
Fig. 1 (Prior Art)
FIG. 1 shows part of a spray gun, partially shown in an exploded view, with an air distributor ring according to the prior art disclosed in Chinese utility model document ZL 2014 2 0431026.7.
Figure 2:
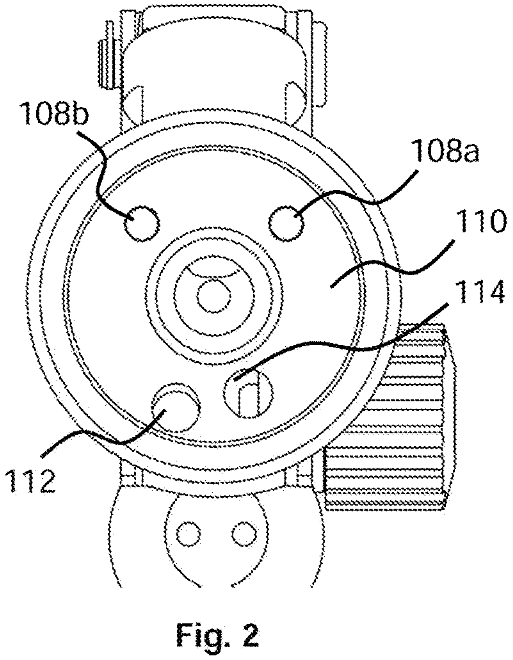
Fig. 2 (Prior Art)
FIG. 2 shows a top view of a head region of a main body of a spray gun according to the prior art disclosed in said Chinese utility model document.
Figure 3:
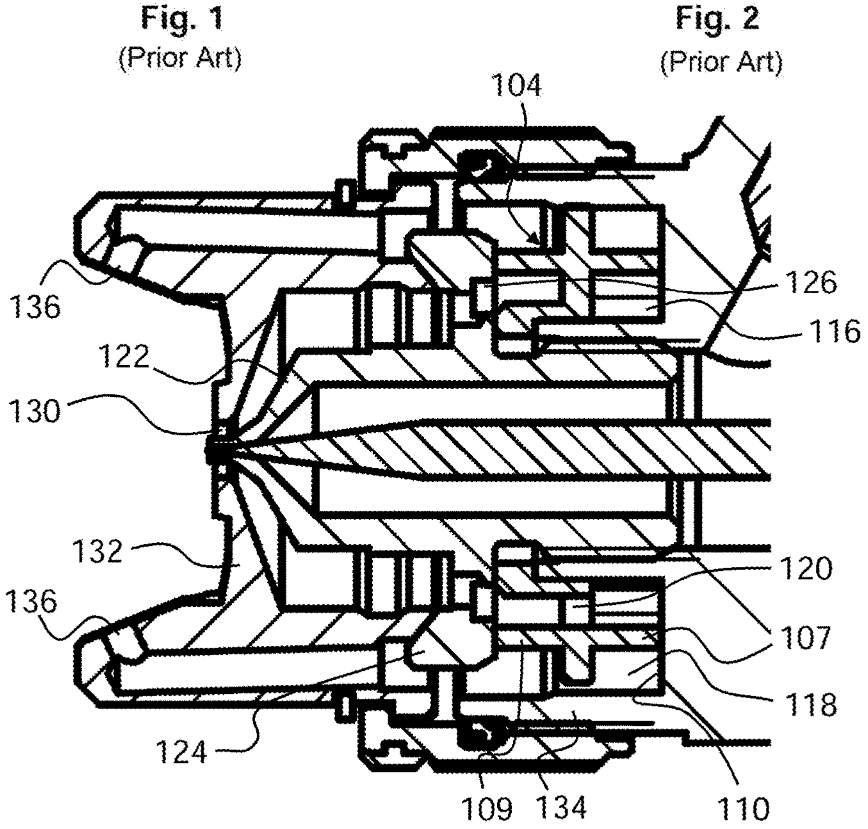
Fig. 3 (Prior Art)
FIG. 3 shows a sectional view of a head region of a spray gun according to the prior art disclosed in Chinese utility model document ZL 2016 2 0911120.1.

The part of a spray gun 100, in particular paint spray gun, as is shown in FIG. 1, according to the prior art, has a main body 102 with various accessory parts. An air-distributor ring 104 is shown which can be arranged on the head region 103 of the main body 102. For this purpose, the air-distributor ring 104 has at least one, in the present example two, holding pins 106*a* and 106*b* which are inserted into two blind holes 108*a* and 108*b*, which correspond to the holding pins 106*a* and 106*b* and are illustrated in FIG. 2, in order to fasten the air-distributor ring 104 to the gun head or to the head region 103 of the main body 102 in such a manner that the wall 107 of the air-distributor ring 104 lies in a sealing manner against the front surface 110 of the head region 103 of the main body 102, as is shown in FIG. 3. The head region 103 shown in FIG. 3 is disclosed in Chinese utility model document ZL 2016 2 0911120.1. An atomizer-air outlet opening 114 in the front surface 110 of the head region 103 of the main body 102 lies here within the wall 107 of the air-distributor ring 104. From the atomizer-air outlet opening 114, atomizer air flows into an inner air-distributor chamber 116 which is formed by the air-distributor ring 104 and the main body 102. A horn-air outlet opening 112 in the front surface 110 of the head region 103 of the main body 102 lies outside the wall 107 of the air-distributor ring 104. From the horn-air outlet opening 112, horn air flows into an outer air-distributor chamber 118 of the air-distributor ring 104.

On a surface within the wall 107, the air-distributor ring 104 has a plurality of passages 120 which are distributed over its circumference and through which the atomizer air flows out of the radially inner air-distributor chamber 116. From the passages 120, the atomizer air flows to a plate 124 which is arranged integrally on the paint nozzle 122 and lies in a sealing manner against a wall 109 of the air-distributor ring 104, wherein the wall 109 is arranged on that side of the air-distributor ring 104 which faces away from the front surface 110 of the head region 103 of the main body 102. The plate 124 has a plurality of passage bores 126 distributed over its circumference. The air which is flowed through the passage bores 126 subsequently flows through an annular gap 130 between the central opening of the air cap 132 and the front end of the paint nozzle 122, which can be configured in the form of a spigot.

The outer air-distributor chamber 118 of the air-distributor ring 104 forms a gap together with an outer wall 134 on the head region 103 of the main body 102, through which gap the horn air flows out of the radially outer air-distributor chamber 118. From there, the air flows into the horn-air supply ducts in the air cap 132 and subsequently into the horn-air bores 136, from the openings of which the air emerges.

Figure 4:
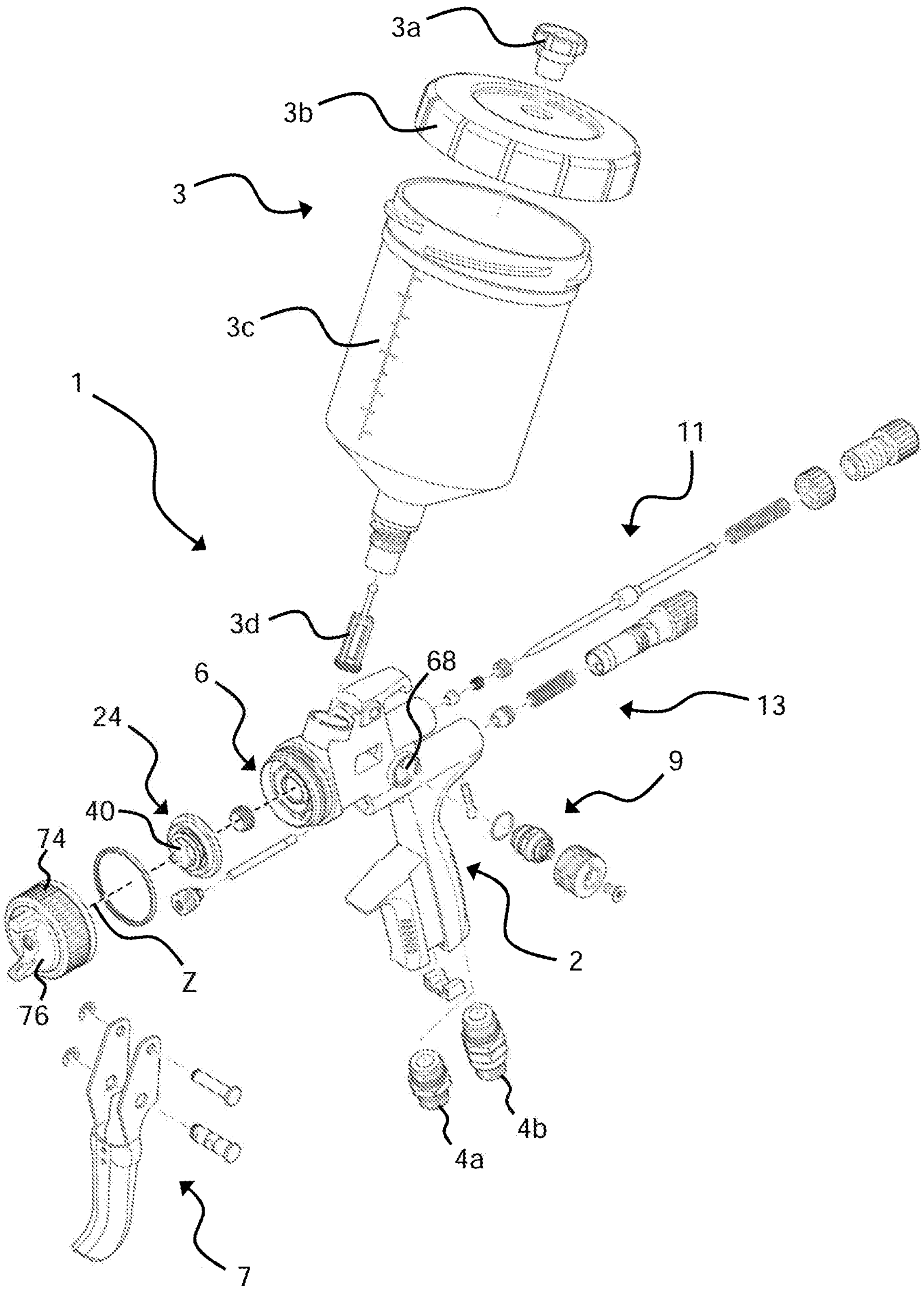
FIG. 4 shows an exploded view of an exemplary embodiment of a spray gun according to the disclosure or a spray gun having an exemplary embodiment of a nozzle according to the disclosure or a nozzle set according to the disclosure.

FIG. 4 shows an exploded view of an exemplary embodiment of a spray gun 1 according to the disclosure or a main body 2 which is equipped with an exemplary embodiment of a nozzle 24 according to the disclosure or a nozzle set according to the disclosure or is equipped with a nozzle produced according to a method of the disclosure and has further accessory parts. The spray gun 1 can have a cup 3 for receiving and dispensing the material to be sprayed, wherein the cup comprises a lid 3*b* with a valve stopper 3*a*, a cup body 3*c* and a plug-in sieve 3*d*. Furthermore, the spray gun 1 can comprise a material-quantity-regulating device 11, an air micrometer 13, a fan control 9, a trigger guard system 7 consisting of a trigger guard and fastening means, and an air connection which can be configured as a standard connection 4*a* or as a rotary-joint connection 4*b*. A nozzle arrangement for a nozzle set comprising a nozzle 24, which can comprise a material nozzle 40, can be arranged on the head region 6 of the main body 2. In addition, the nozzle set can comprise an air cap 76 which can be fastened, in particular can be screwed, to the head region 6 via an air nozzle ring 74. The head region 6, the nozzle 24 and the air cap 76 with an air nozzle ring 74 are arranged or can be arranged here coaxially along an axis Z which here constitutes the above-mentioned central or longitudinal axis of the head region 6 of the main body 2, the central or longitudinal axis of the material nozzle 40, the central or longitudinal axis of the upper part of the main body 2 and the central or longitudinal axis of a receiving opening for receiving the material-quantity-regulating device 11.

Figure 5:
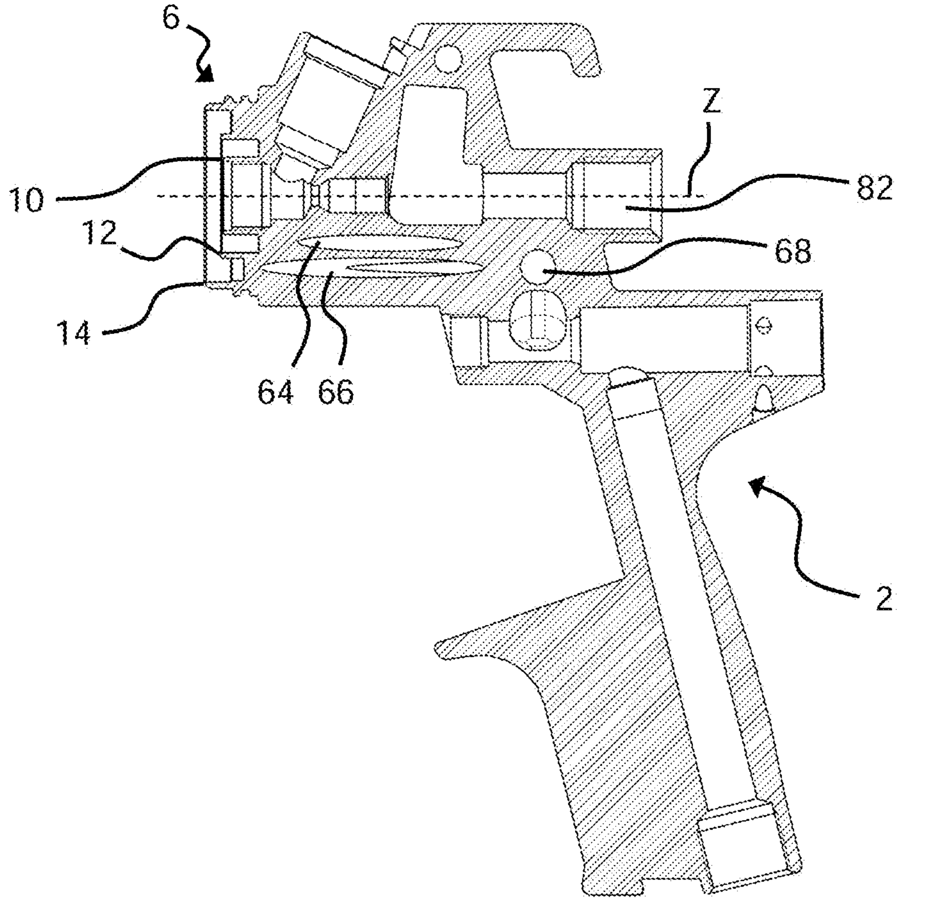
FIG. 5 shows a sectional view of a main body for an exemplary embodiment of a spray gun according to the disclosure or of a main body for use with an exemplary embodiment of a nozzle according to the disclosure or a nozzle set according to the disclosure.

FIG. 5 illustrates a sectional view of the main body 2 for a spray gun from FIG. 4, wherein the section is undertaken from the top downwards through the axis Z from FIG. 4. The main body which is shown is suitable in particular for use with a nozzle according to the disclosure, a nozzle set according to the disclosure and/or a nozzle produced according to a method according to the disclosure and/or can be used in particular for producing a spray gun according to the disclosure. The main body 2 has a multiplicity of bores; in the upper part of the main body 2 in particular a plurality of bores along an axis Z, which here constitutes the above-mentioned central or longitudinal axis of the head region 6 of the main body 2. In the present exemplary embodiment, said axis is the same as the central or longitudinal axis of the material nozzle 40, which can be arranged in or on the main body 2, from FIG. 4 and the same as the central or longitudinal axis of the upper part of the main body 2 and the same as the central or longitudinal axis of a receiving opening 82 for receiving a material-quantity-regulating device 11, which is shown by way of example in FIG. 4.

As can be seen in FIG. 5, the middle wall 12 is clearly set back in the axial direction in relation to the outer wall 14, wherein the direction of the axis Z is meant by axial direction. The spray direction or the side of the main body 2 on which the material nozzle 40 from FIG. 4 can be arranged is considered here to be "at the front", and the opposite side or opposite direction, here the side with the receiving opening 82 as "at the rear". The fact that the front end of the middle wall 12 is "set back" in the axial direction in relation to the front end of the outer wall 14 means that the front end of the outer wall 14 is further at the front than the front end of the middle wall 12.

In the present exemplary embodiment, the inner wall 10 is only slightly set back in relation to the middle wall 12.

In FIG. 5, only a single atomizer-air duct 64 can be seen, as can a horn-air duct 66 which intersects a second horn-air duct. In addition, the sectional view shows part of a fan control air-distributor chamber 68.

Figure 6:
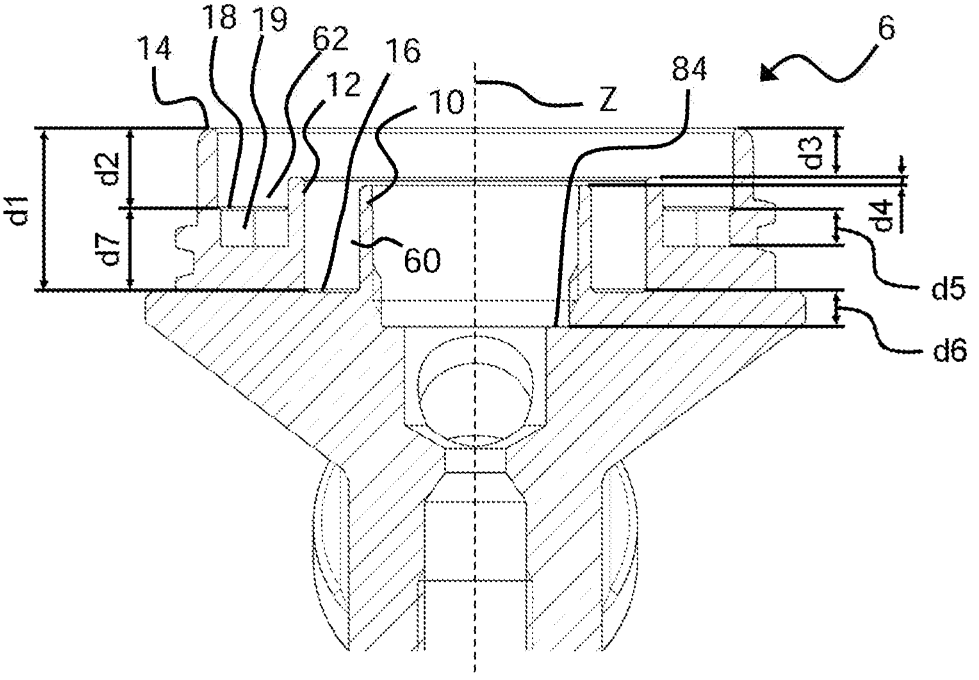
FIG. 6 shows a sectional view of the head region of a main body for an exemplary embodiment of a spray gun according to the disclosure or a main body for use with an exemplary embodiment of a nozzle according to the disclosure or a nozzle set according to the disclosure.

FIG. 6 shows a sectional view of a part of the main body 2 for a spray gun 1, which part is shown in a different sectional view in FIG. 5. The section shown in FIG. 6 is again undertaken through the axis Z from FIG. 4, but along a section plane which is perpendicular to the section plane used in FIG. 5. In FIG. 6 here, it can be seen that the inner wall 10 of the head region 6 of the main body 2 of the spray gun 1 is set back in the axial direction by a distance d4 in relation to the middle wall 12. The middle wall 12 in turn is set back in the axial direction by a distance d3 in relation to the outer wall 14. In other words, the outer wall 14 projects over the middle wall 12 which, in turn, projects over the inner wall 10. The inner wall 10 and the outer wall 12 delimit a first air-distributor chamber 60, and the middle wall 12 and the outer wall 14 delimit a second air-distributor chamber 62. Towards the front, i.e. in the spray direction, the air-distributor chambers 60 and 62 are open, and, towards the rear, they are bounded at least in regions by a first front surface 16 and a second front surface 18, respectively. In the present exemplary embodiment, a groove 19 is introduced into the second front surface 18, the bottom surface of which groove bounds the air-distributor chamber 62 instead of the second front surface 18 to the rear in regions. The air-distributor chamber 62 is therefore bounded towards the rear, i.e. in regions, by the second front surface 18 and in regions by the bottom surface of the groove 19. The distance d5, i.e. the depth of the groove 19, i.e. the distance between the second front surface 18 and the bottom surface of the groove 19, can be, for example, approx. 1.5 mm to 3.0 mm. The distance d1 between the first front surface 16 and the front end of the outer wall 14 is preferably between 8 mm and 12 mm, particularly preferably between 9 mm and 11 mm. The distance d2 between the second front surface 18 and the front end of the outer wall 14 is preferably between 4 mm and 6 mm. The middle wall 12 here is set back in the axial direction by a distance d3, which is preferably approx. 2 mm to 4 mm, in relation to the outer wall 14. The inner wall 10 is preferably set back in relation to the middle wall 12 only by 0.1 mm to 1.0 mm. This is the distance d4. The exemplary embodiment, shown in FIG. 6, of a head region 6 of a main body according to the disclosure has a mating sealing surface 84 for a sealing element, not shown in FIG. 6. The distance d6 of said mating sealing surface 84 from the first front surface 16 is preferably approximately 1.5 mm to 3.0 mm. The first front surface 16 is set back in the axial direction in relation to the second front surface 18. In the present exemplary embodiment, the distance d7 by which the front surface 16 is set back in relation to the second front surface 18, is approx. 4 mm to 6 mm. In spray tests, the dimensions or dimension combinations mentioned have proven advantageous for good atomization quality, in particular in conjunction with a nozzle according to the disclosure, a nozzle set according to the disclosure and a nozzle produced according to a method of the disclosure.

Figure 7:
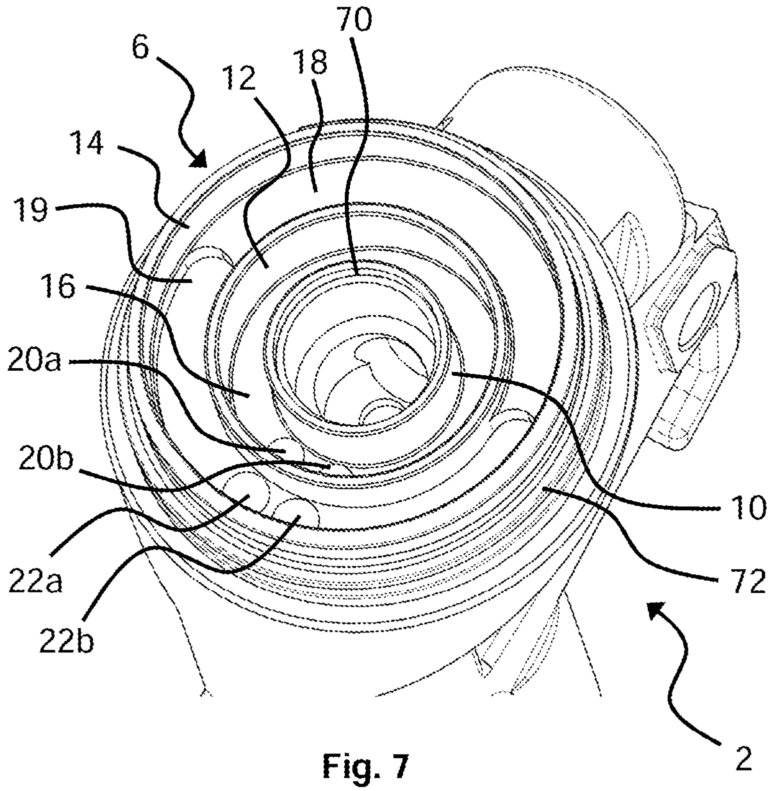
FIG. 7 shows a perspective view of the head region of a main body for an exemplary embodiment of a spray gun according to the disclosure or a main body for use with an exemplary embodiment of a nozzle according to the disclosure or a nozzle set according to the disclosure.

FIG. 7 shows a perspective view of a part of the main body 2 from FIG. 5 and FIG. 6. In particular the groove 19 in the second front surface 18 can readily be seen here. The width of the groove 19 has approximately the same width as the second front surface 18. The width of the groove 19 or of the second front surface 18 should be understood here as meaning in each case the extent in the radial direction of the head region 6 of the main body 2 or else the distance between the middle wall 12 and the outer wall 14 in the radial direction. In the circumferential direction, the groove 19 extends over approximately 50% of the circumference of the second front surface 18, i.e. here over approximately 180%. In the present main body, the inner wall 10, the middle wall 12 and the outer wall 14 are each of circular configuration and are arranged concentrically with respect to one another and coaxially with respect to the axis Z from the previous drawings. The axis Z runs through the axis of rotation of the walls, and the walls run parallel to the axis Z.

The inner wall 10 here has an internal thread 70 into which a nozzle, not shown in FIG. 7, in particular a nozzle according to the disclosure or a nozzle produced according to a method of the disclosure, wherein said nozzles may comprise a material nozzle, which is frequently also called paint nozzle, can be screwed. The outer wall 14 here has an external thread 72 via which an air nozzle ring, not shown in FIG. 7, can be screwed with an air cap onto the head region 6 of the main body 2. By means of the internal thread 70 and/or the external thread 72, a nozzle set according to the disclosure or at least part thereof can be arranged on the main body. The middle wall 12 here does not have a thread. However, it is conceivable for the middle wall 12 to also be able to have an internal or external thread. Furthermore, it is conceivable that the outer wall 14 has an internal thread for the screwing-in of a component, in particular an air cap, and the inner wall 10 has an external thread for the screwing-on of a component, in particular a nozzle.

The first front surface 16 here has two radially inner air outlet openings 20*a* and 20*b*, the second front surface 18 here has two radially outer air outlet openings 22*a* and 22*b*. The diameter of the air outlet openings 20*a*, 20*b*, 22*a* and 22*b* corresponds virtually to the width of the front surfaces 16, 18 or of the groove 19 into which they are introduced. The available space can therefore be used for a maximum throughput of air.

Figure 8:
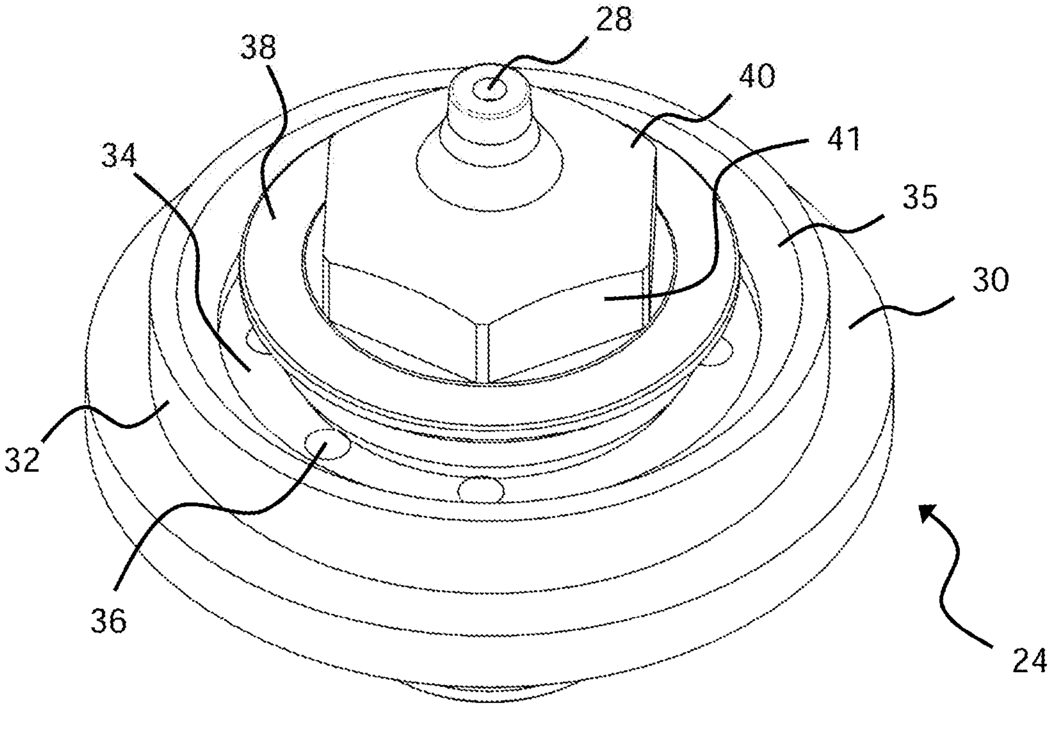
FIG. 8 shows a perspective view of an exemplary embodiment of a nozzle according to the disclosure.
Figure 9:
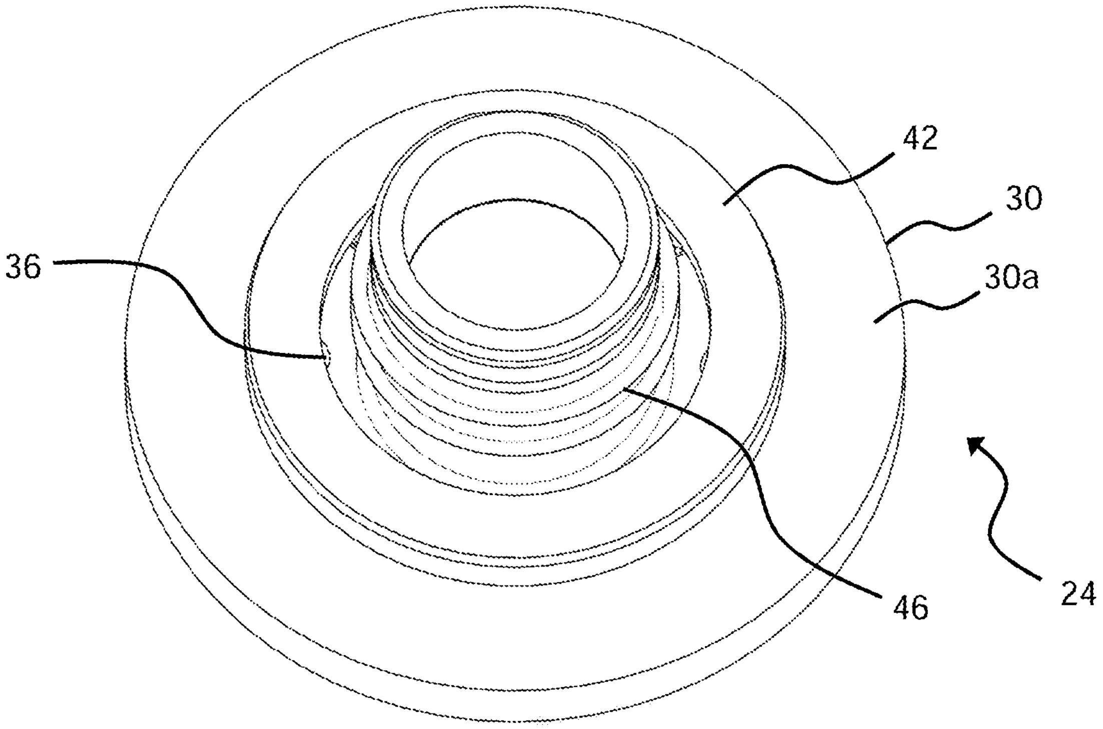
FIG. 9 shows a perspective view of the exemplary embodiment of a nozzle according to the disclosure from FIG. 8 from a different side.

FIG. 8 shows a perspective view of an exemplary embodiment of a nozzle 24 according to the disclosure. The nozzle 24 can have at least one material nozzle 40 with a material outlet opening 28 and a portion for the fitting of a tool, in the present case a hexagonal stub 41, and a disk element 32 with a front surface 34 and a conical surface 35. The front surface 34 here has a plurality of passage openings 36, preferably seven to nine, distributed over the circumference. The material nozzle 40 and the disk element 32 are preferably configured integrally. Arranged thereon, preferably arranged captively, particularly preferably pressed thereon, is a first baffle disk 30 which has a larger outer circumference than the disk element 32. Arranged in turn on said first baffle disk 30, preferably integrally arranged, is a second baffle disk 42 which can be seen in FIG. 9 and has a smaller outer circumference than the first baffle disk. The second baffle disk is arranged on that side of the first baffle disk 30 which faces away from the material outlet opening 28. Like the first baffle disk 30, the second baffle disk 42 is also configured annularly with an inner and an outer circumference. The inner circumference of the second baffle disk 42 does not extend in the radial direction as far as the external thread 46 of the material nozzle 40, and therefore there is a gap between the inner circumference of the second baffle disk 42 and the external thread 46 of the material nozzle 40. The second baffle disk 42 is spaced apart from the passage openings 36 in the axial direction, i.e. in the direction of the central or longitudinal axis of the nozzle 24.

Figure 10:
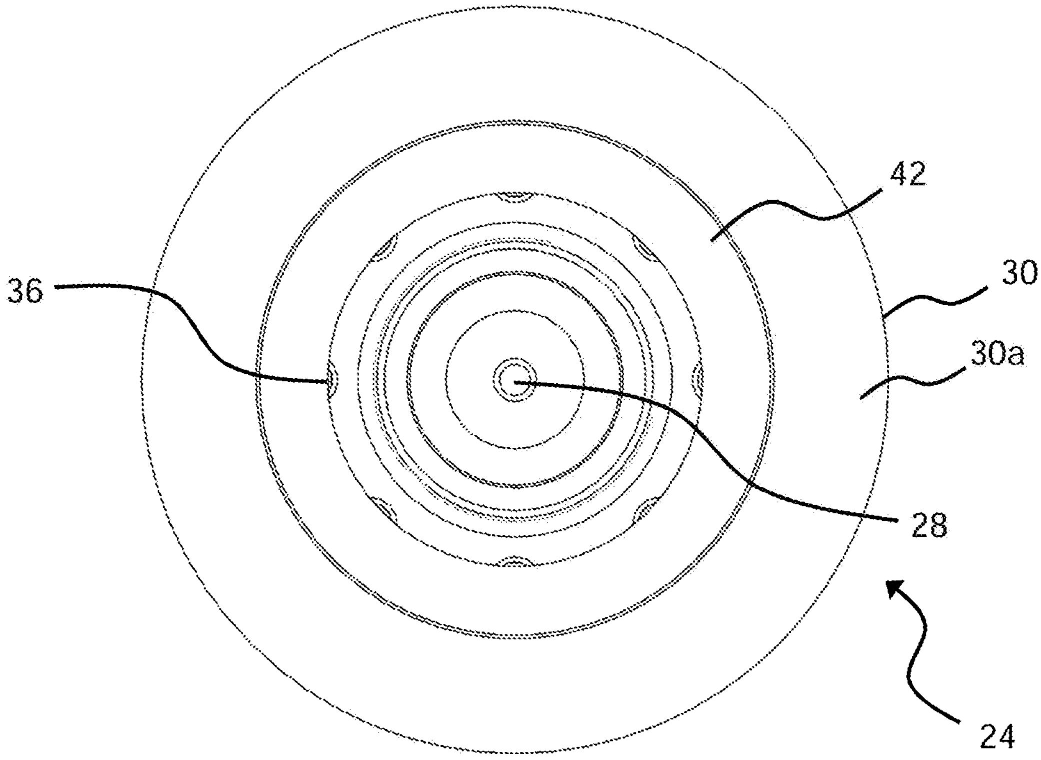
FIG. 10 shows a view from the rear of the exemplary embodiment of a nozzle according to the disclosure from FIG. 8.

In the radial direction, the second baffle disk 42 virtually completely projects over or overlaps the passage openings 36, as can readily be seen in FIG. 10. In addition, the material outlet opening 28 and the baffle surface 30*a* of the first baffle disk 30 can be seen in FIG. 10. In the present exemplary embodiment, the first baffle disk 30 and the disk element 32 each have a circular outer circumference and are arranged concentrically with respect to each other. On its side facing away from the material outlet opening 28, the disk element 32 preferably has a recess or a groove in which the passage openings 36 are arranged. This increases the distance between that side of the disk element 32 which faces away from the material outlet opening 28 and that side of the second baffle disk 42 which faces said side, and the air which flows into said region has more volume available in order to be distributed.

Figure 11:
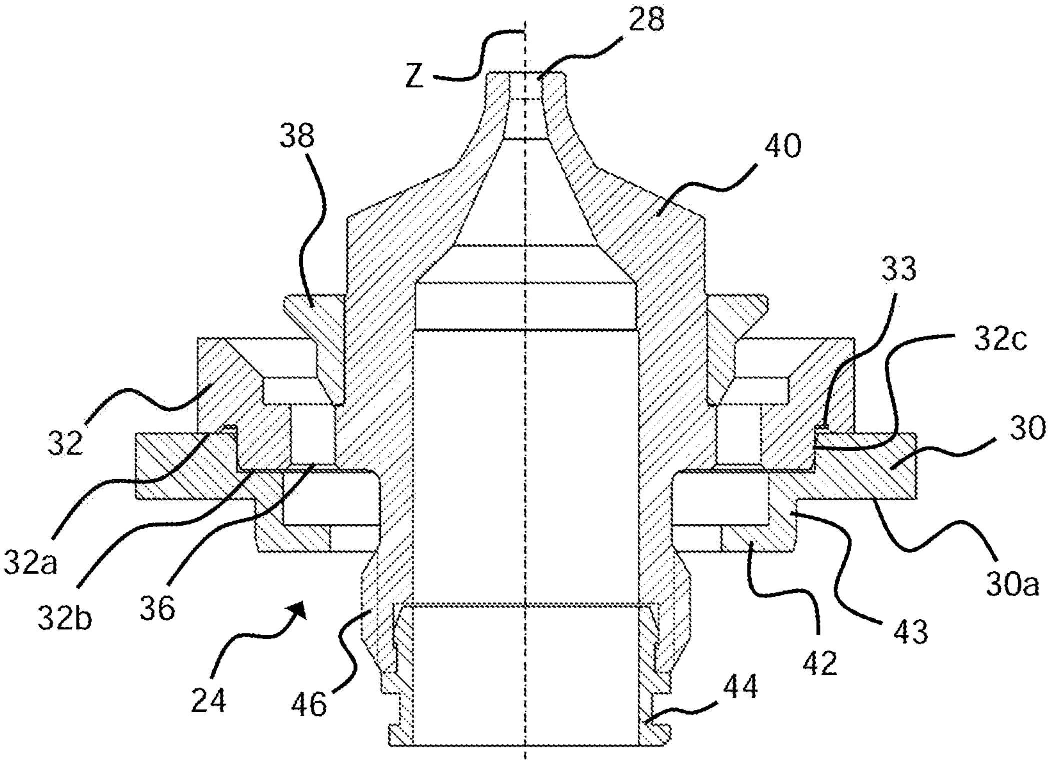
FIG. 11 shows a sectional view of the exemplary embodiment of a nozzle according to the disclosure from FIG. 8.

FIG. 11 shows the design of the exemplary embodiment of a nozzle 24 according to the disclosure in a sectional view. It can be seen that the material nozzle 40 with its material outlet opening 28 and the disk element 32 are configured integrally. On a surface 32*a* facing away from the material outlet opening 28, the disk element 32 has an encircling groove 33 which permits or facilitates the pressing of the first baffle disk 30 onto the disk element 32. The first baffle disk 30 has an inner circumference and an outer circumference, wherein the outer circumference of the first baffle disk 30 is larger than the outer circumference of the disk element 32. The inner circumference of the first baffle disk 30 extends approximately as far as the passage openings 36 of the disk element 32. The second baffle disk 42 is arranged integrally on the first baffle disk 30.

An inner collar 43 can be arranged inbetween. The first baffle disk 30, the second baffle disk 42 and optionally the inner collar 43 here form a Z shape. On its side facing the material outlet opening 28, in particular in the region of the inner circumference, the first baffle disk 30 can have a cutout such that a step shape is formed which can form the contact region between the first baffle disk 30 and the disk element 32. On its side facing away from the material outlet opening 28, in particular in the region of the outer circumference, the disk element 32 here likewise has a step which forms the contact region between the first baffle disk 30 and the disk element 32. The disk element 32 and the first baffle disk 30 are connected to each other directly, in particular without a sealing element arranged inbetween, and the connection between the disk element 32 and the first baffle disk 30 is configured to be substantially air-impermeable. In the region between its inner circumference and its outer circumference, the first baffle disk 30 is configured from continuous material; in particular, it does not have any passage openings. In the present exemplary embodiment, the disk element has three contact surfaces which are formed by a first surface 32*a* of the disk element 32, said surface facing away from the material outlet opening 28, a second surface 32*b* of the disk element 32, said surface facing away from the material outlet opening 28, and a third surface 32*c* of the disk element 32, said surface being arranged between the first surface 32*a* and the second surface 32*b*. The first baffle disk 30 likewise has three contact surfaces which are formed by the mating surfaces of the first baffle disk 30, said mating surfaces each bearing against the contact surfaces of the disk element 32. The contact surfaces are arranged substantially at right angles to one another. The various contact surfaces can be differentiated from one another by being arranged at an angle unequal to 180° with respect to one another or being separated from one another by grooves. Due to manufacturing tolerances, it is difficult for both the first surface 32*a* and the second surface 32*b* to be in contact with the respective mating surface of the first baffle disk 30. A gap caused by the manufacturing technique between the first surface 32*a* and/or second surface 32*b* and the respective mating surface of the first baffle disk 30 is not intended to be taken into consideration and is intended also to be considered to be a contact surface. In particular the third surface 32*c* of the disk element 32 and/or the mating surface of the first baffle disk 30 can be of slightly conical configuration and/or can have a phase in order to facilitate the attaching, in particular pressing of the first baffle disk onto the disk element.

A surface 30*a* of the first baffle disk 30, said surface facing away from the material outlet opening 28, is set back along an axis Z in relation to that surface 32*b* of the disk element 32 which faces away from the material outlet opening 28, i.e. the surface 32*b* of the disk element 32 is closer in the axial direction to the material outlet opening 28 than the surface 30*a* of the first baffle disk 30.

The nozzle 24 is equipped here with an air-directing disk 38 which can likewise be connected captively to the nozzle 24, in particular the material nozzle 40, in particular can be pressed thereon, and can be arranged downstream of the at least one passage opening 36 of the disk element 32 in the direction of the nozzle longitudinal axis. In addition, the present nozzle 24 has a sealing element 44, the purpose of which will be explained further below. The sealing element 44 which is frequently also referred to as the nozzle or paint nozzle seal, is preferably composed of plastic and is preferably connected interchangeably to the material nozzle 40. Furthermore, the external thread 46 of the material nozzle 40 is indicated in FIG. 11.

Figure 12:
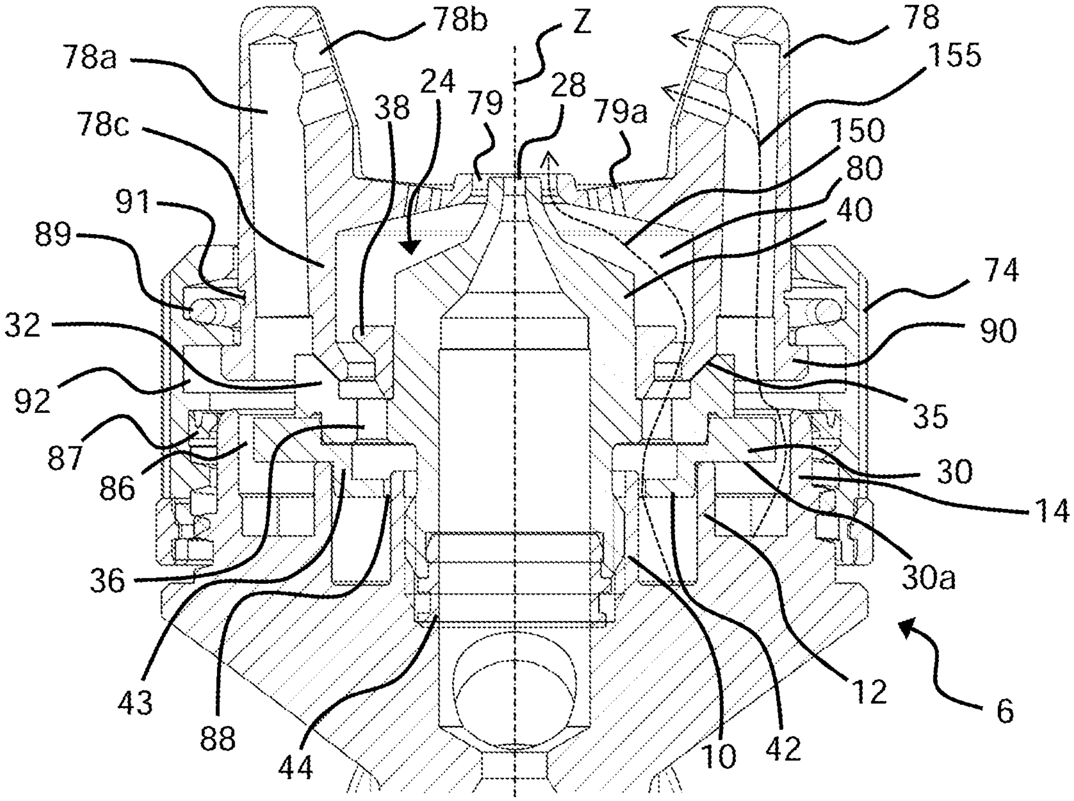
FIG. 12 shows a sectional view of the head region of an exemplary embodiment of a spray nozzle according to the disclosure or a main body equipped with an exemplary embodiment of a nozzle according to the disclosure from FIG. 8 or a main body equipped with an exemplary embodiment of a nozzle set according to the disclosure.

FIG. 12 shows a sectional view of the head region 6 of an exemplary embodiment of a spray gun according to the disclosure or a main body equipped with the exemplary embodiment of a nozzle 24 according to the disclosure from FIG. 8 to FIG. 11 or a main body equipped with an exemplary embodiment of a nozzle set according to the disclosure, which comprises the exemplary embodiment of a nozzle 24 according to the disclosure from FIG. 8 to FIG. 11, in the assembled state. The nozzle 24 which is present here as a unit consisting of a material nozzle 40 with a disk element 32, a first baffle disk 30, a second baffle disk 42, an air-directing disk 38 and a sealing element 44, is screwed via the above-described thread into the main body or into the head region thereof. The stop is formed here by the first baffle disk 30, in particular the baffle surface 30*a* thereof, and the middle wall 12 of the head region 6 of the main body. The baffle surface 30*a* of the first baffle disk 30 acts here as a sealing surface, and the middle wall 12, in particular the front end of the middle wall 12, acts as a mating sealing surface against which the baffle surface 30*a* lies in a sealing manner. Alternatively or additionally, the outer surface of the second baffle disk 42 or the outer surface of the inner collar 43 between the first baffle disk 30 and the second baffle disk 42 can also lie in a sealing manner against an inner surface of the middle wall 12.

When the nozzle 24 is screwed in, the sealing element 44 is pressed against a mating sealing surface 84, which is shown in FIG. 6, and seals the material-guiding region of the spray gun, in particular the transition region between the paint duct in the main body and hollow portion of the material nozzle 40 for the passage of the material to be sprayed, in relation to the air-guiding region of the spray gun.

In the installed state, the first baffle disk 30 together with the outer wall 14 forms a gap 86 which is preferably an annular gap having a substantially constant width. The second baffle disk 42 together with the inner wall 10 forms a further gap 88 which is likewise preferably an annular gap having a substantially constant width. The inner collar 43 is arranged in the radial direction directly next to the middle wall 12 of the main body 2, in particular directly next to an inner surface of the middle wall 12 of the main body 2.

The air nozzle ring 74 can be arranged on the head region 6 of the main body via the thread already mentioned above. The air cap 78 is arranged in the air nozzle ring 74, wherein the air cap 78 is fixed in a first direction by means of a flange 90 which lies against a projection on the inner surface of the air nozzle ring 74. In the opposite direction, the air cap 78 is bounded by a securing ring 89 which lies in a groove 91 in the air cap 78 and in a cutout in the inner surface of the air nozzle ring 74. Merely for better visibility, the securing ring 89 in FIG. 12 here is illustrated outside the groove 91, with the securing ring 89 also not having to be completely located in the groove 91. For example, the securing ring 89 can be of polygonal configuration, and therefore it lies only in regions in the circular groove 91.

As can be seen in FIG. 7, in the present exemplary embodiment of the main body according to the disclosure, the first front surface 16 between the inner wall 10 and the middle wall 12 and the second front surface 18 between the middle wall 12 and the outer wall 14 in each case have two air outlet openings 20*a* and 20*b*, and 22*a* and 22*b*, respectively. Again with reference to FIG. 12, it is apparent that the air flowing out of the two radially inner air outlet openings 20*a* and 20*b* between the inner wall 10 and middle wall 12 first of all impinges on the second baffle disk 42 which is arranged downstream of the radially inner air outlet openings 20*a*, 20*b* in the main body 2 in the direction of the nozzle longitudinal axis and is spaced apart in the axial direction from the radially inner air outlet openings 20*a*, 20*b* and at least partially, preferably completely or virtually completely, projects over the air outlet openings 20*a*, 20*b* in the radial direction. On account of the constriction in the form of the gap 88, the air is distributed over the circumference of the air-distributor chamber between the inner wall 10 and the middle wall 12. The air flows through the gap 88 and is thereby restricted before the air flows through the passage openings 36 of the disk element 32. The air emerging to a certain extent "in a punctiform manner" from the passage opening 36 impinges on the air-guiding element 38, as a result of which the air is distributed more extensively, is homogenized and is slightly restricted again by the slight narrowing between the air-directing element 38 and the inner surface of the air cap 78. From the air-cap chamber 80 between the air cap 78 and the material nozzle 40, the air then flows through a gap, in particular annular gap, which arises by the fact that the front end of the material nozzle 40 projects from the inner side into the central opening 79 in the air cap 78. The material to be sprayed which flows out of a material supply device through the paint duct in the main body of the spray gun and the hollow portion of the material nozzle 40 is atomized by the air flowing out of the gap, as a result of which what is referred to as the spray jet is formed. The air with the profile just described is therefore referred to as atomizer air. The two radially inner air outlet openings 20*a* and 20*b* between the inner wall 10 and the middle wall 12 may be referred to as atomizer-air outlet openings, the air ducts located therebehind as atomizer-air ducts, and the air-distributor chamber, which can be bounded by the inner wall 10 and the middle wall 12, as atomizer-air distributor chamber. The region through which the atomizer air flows may be referred as the atomizer-air region.

The abovementioned internal nozzle pressure is the pressure prevailing in the air cap-chamber 80.

The air flowing out of the two radially outer air outlet openings 22*a* and 22*b*, which although present in the main body shown in FIG. 12, can be particularly readily seen in FIG. 7, first of all impinges on the first baffle disk 30 which is arranged downstream of the radially outer air outlet openings 22*a*, 22*b* in the main body 2 in the direction of the nozzle longitudinal axis and is spaced apart in the axial direction from the radially outer air outlet openings 22*a*, 22*b* and projects at least partially, preferably completely or virtually completely, over the radially outer air outlet opening 22*a*, 22*b* in the radial direction. Due to the constriction in the form of the gap 86, the air is distributed over the circumference of the air-distributor chamber between the middle wall 12 and the outer wall 14. The air flows through the gap 86 and is thereby restricted. The air advantageously subsequently flows into an intermediate chamber 92 and into the horn-air supply ducts 78*a* in the horns of the air cap 78. From here, the air flows out of the horn-air bores 78*b* and impinges on the abovementioned spray jet and deforms the latter. In particular, what is referred to as horn air flowing out of the horn-air bores 78*b* in the diametrically opposite horns of the air cap 78 compresses the spray jet, which originally has circular cross section, on two opposite sides, thus resulting in what is referred to as a wide jet. The quantity of horn air flowing out of the horn-air bores 78*b* or even the quantity of air flowing out of the radially outer air outlet openings 22*a* and 22*b*, which may be referred to as horn-air outlet openings, can be adjusted via a fan control 9, which is shown by way of example in FIG. 4. If the horn air is reduced to zero or virtually zero, the spray gun produces what is referred to as a circular jet with a circular cross section. The air ducts behind what are referred to as the horn-air outlet openings can be referred to as horn-air ducts, the air-distributor chamber which is bounded by the middle wall 12 and the outer wall 14 may be referred to as the horn-air distributor chamber and the region through which the horn air flows may be referred to as the horn-air region. For sealing the horn-air region in relation to the environment, a sealing element 87 can be provided between the air nozzle ring 74 and the head region 6.

What are referred to as control openings 79*a* can be introduced into the front surface of the air cap 78, radially outside the central opening 79. The air emerging from the control openings 79*a* influences the horn air, in particular weakens the impact of the horn air on the spray jet. Furthermore, what is referred to as the control air projects the air cap 78 against soiling by carrying paint droplets away from the air cap 78. In addition, it contributes to the further atomization of the spray jet. The control air also acts on the round jet and brings about a slight preliminary deformation and also here additional atomization.

As can readily be seen in FIG. 12, the separation, in particular the sealing, between the atomizer-air region and the horn-air region takes place by means of the middle wall 12, the first baffle disk 30, the disk element 32 and by means of the air cap 78, in particular by means of a preferably encircling web 78*c* of the air cap 78. Similarly, the separation of the above-described first air flow path 150 and the above-described second air flow path 155 takes place. The web 78*c* here has a conical region which lies against the conical surface 35 of the disk element 32. As a result, centring of the air cap 78 also takes place, and it is thereby ensured that the air cap 78 and the material nozzle 40 are arranged concentrically with respect to each other, and the abovementioned gap, in particular annular gap, between the front end of the material nozzle 40 and the air cap 78 has a constant width for letting out the atomizer air.

It is clear that, on account of the particular configuration of the nozzle according to the disclosure and the spray gun according to the disclosure, no additional sealing element for sealing between the atomizer-air region and horn-air region is necessary.

The exemplary embodiment, shown in FIGS. 8 to 12, of a nozzle 24 according to the disclosure is preferably a low-pressure nozzle or HVLP nozzle or a nozzle for use in a low-pressure or HVLP nozzle set or a nozzle for use in a low-pressure or HVLP spray gun.

Figure 13:
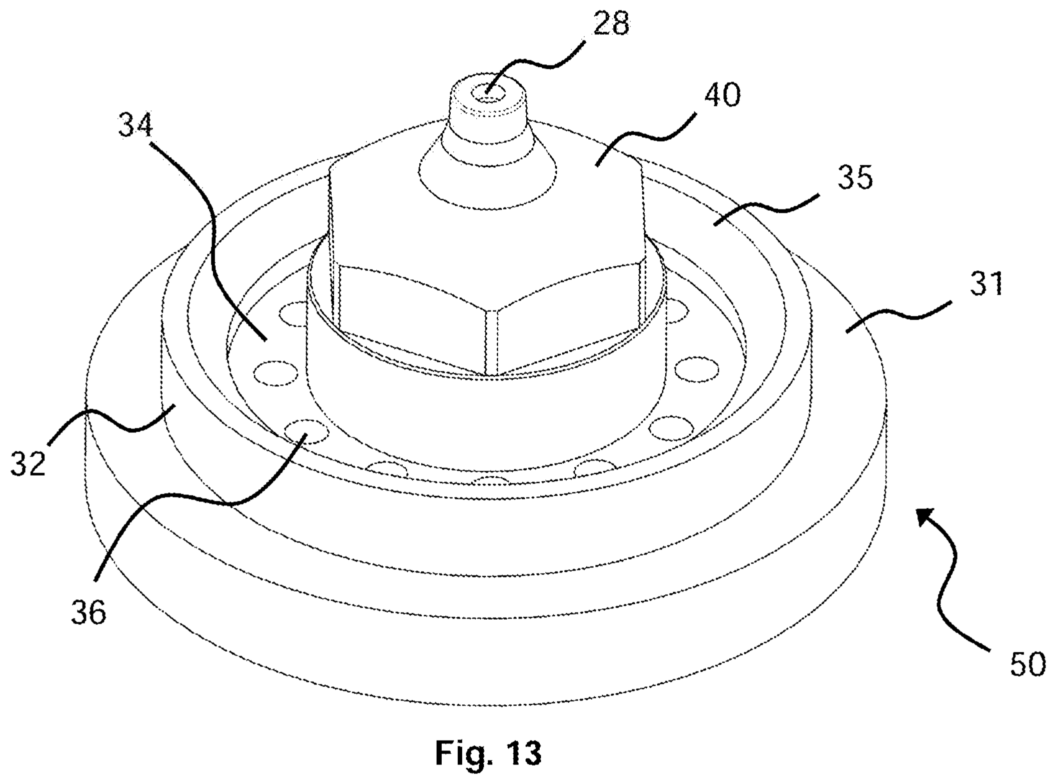
FIG. 13 shows a perspective view of a second exemplary embodiment of a nozzle according to the disclosure.

FIG. 13 shows a perspective view of a second exemplary embodiment of a nozzle 50 according to the disclosure. In comparison with the first exemplary embodiment shown in FIGS. 8 to 12, the present nozzle 50 does not have an air-directing disk, and the disk element 32 has a greater number of passage openings 36 in the front surface 34, for example eleven to thirteen. Otherwise, the nozzle 50 also has a material nozzle 40 with a material outlet opening 28, and the disk element 32 has a conical surface 35. On its side facing away from the material outlet opening 28, the disk element 32 preferably has a recess or a groove in which the passage openings 36 are arranged. In the installed state of the nozzle 50, this increases the distance between that side of the disk element 32 which faces away from the material outlet opening 28 and the first front surface 16 of the head region 6 of the main body 2, and the air which flows into said region has more volume available in order to be distributed.

Figure 14:
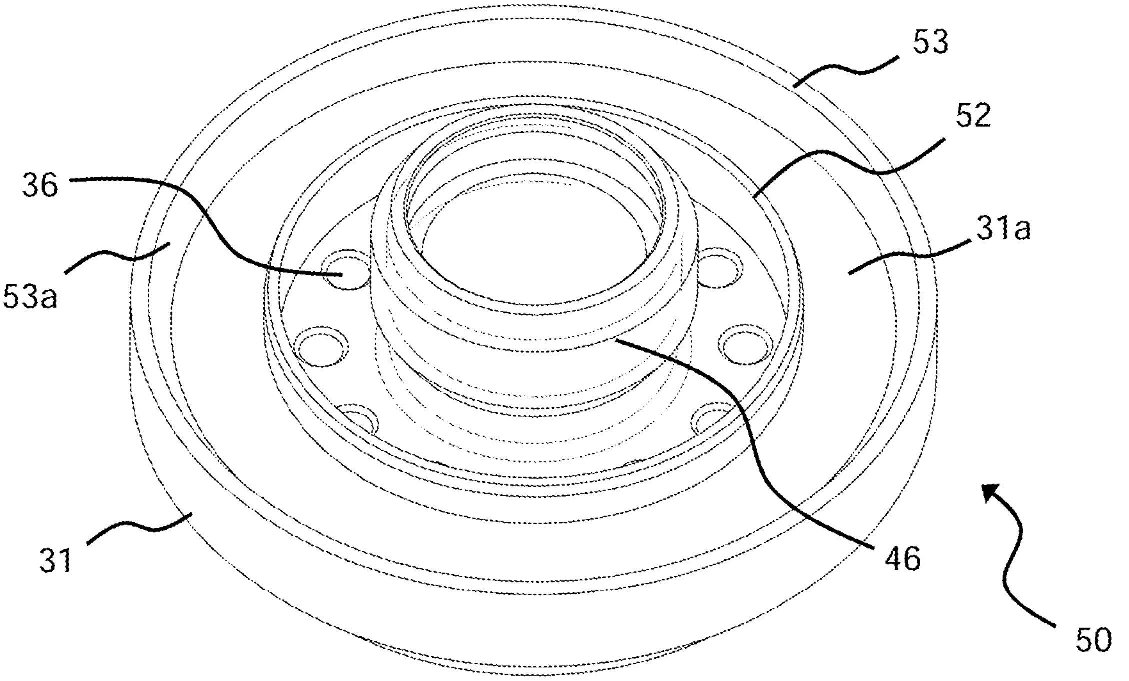
FIG. 14 shows a perspective view of the exemplary embodiment of a nozzle according to the disclosure from FIG. 13 from a different side.

It can be seen for the first time in FIG. 14 that the first baffle disk 31 of the nozzle 50 is configured differently from the first baffle disk 30 of the previously described nozzle 24. The nozzle 50 does not have a second baffle disk and instead has an inner collar 52 and an outer collar 53 with a baffle surface 31*a* lying inbetween. The outer collar 53 is arranged on the outer circumference of the first baffle disk 31, and the inner collar 52 is arranged on the inner circumference of the first baffle disk 31. The outer collar 53 has an oblique surface 53*a*.

Figure 15:
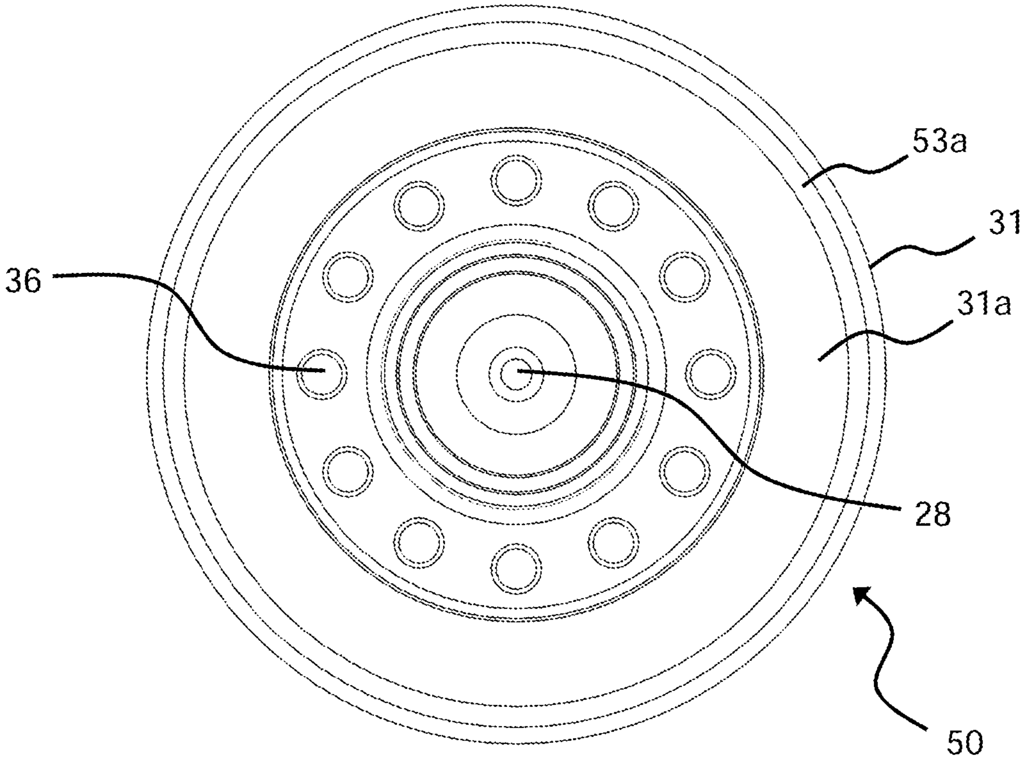
FIG. 15 shows a view from the rear of the exemplary embodiment of a nozzle according to the disclosure from FIG. 13.

It becomes clear in FIG. 15, which shows a view from the rear of the nozzle 50, that the passage openings 36 are completely exposed, i.e. are not concealed or projected over by other components of the nozzle 50. The disk element 32 of the nozzle 50 preferably has a greater number of passage openings 36, in particular between 10 and 14.

Figure 16:
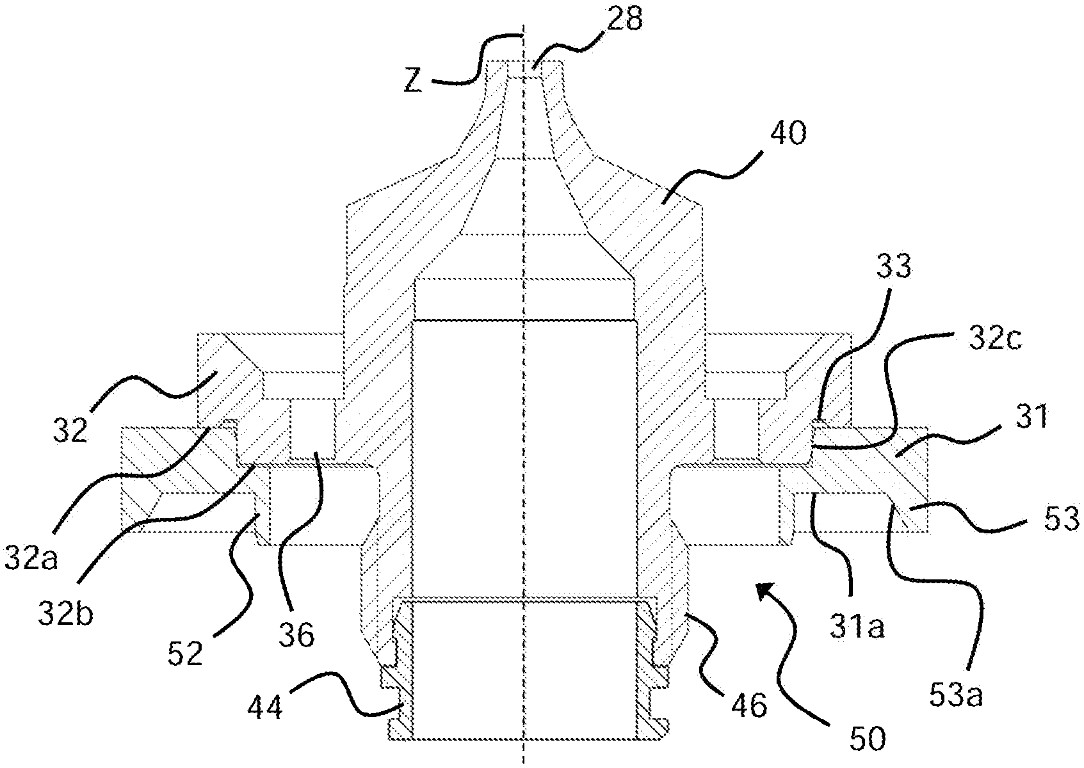
FIG. 16 shows a sectional view of the exemplary embodiment of a nozzle according to the disclosure from FIG. 13.

The exposed passage openings 36 are also apparent in FIG. 16 which is a section view of the nozzle 50. The material nozzle 40 with the disk element 32 arranged integrally and the sealing element 44 preferably arranged interchangeably is substantially identical to the material nozzle 40 with the disk element 32 arranged integrally and the sealing element 44, which is preferably arranged interchangeably, of the above-described nozzle 24. The statements above with regard to these components apply correspondingly to the nozzle 50. The first baffle disk 31 with the inner collar 52, outer collar 53 and baffle surface 31*a* lying therebetween differs from the first baffle disk 30 of the previously described nozzle 24.

Figure 17:
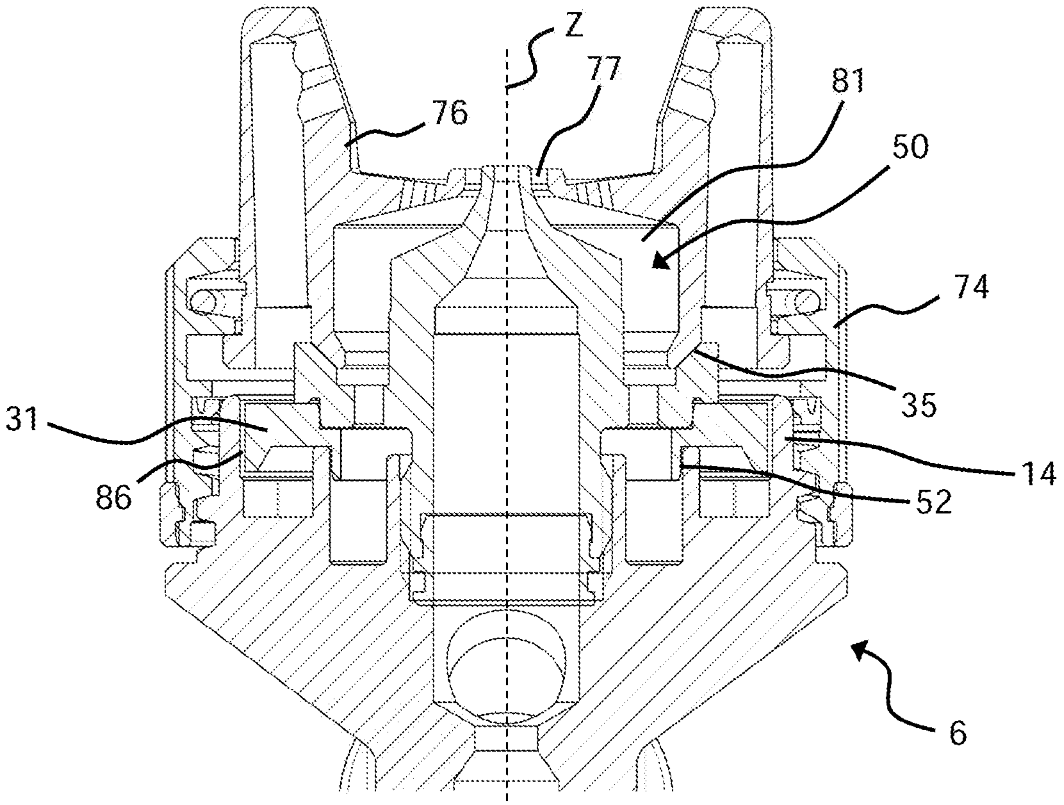
FIG. 17 shows a sectional view of the head region of an exemplary embodiment of a spray nozzle according to the disclosure or a main body equipped with the exemplary embodiment of a nozzle according to the disclosure from FIG. 13 or a main body equipped with an exemplary embodiment of a nozzle set according to the disclosure.

FIG. 17 shows a section view of the head region 6 of an exemplary embodiment of a spray gun according to the disclosure or a main body equipped with the exemplary embodiment of a nozzle 50 according to the disclosure from FIG. 13 to FIG. 16 or a main body equipped with an exemplary embodiment of a nozzle set according to the disclosure, which comprises the exemplary embodiment of a nozzle 24 according to the disclosure from FIG. 13 to FIG. 16, in the assembled state. The main body is the exemplary embodiment shown in FIG. 12. In particular, the head region 6 is configured identically, and therefore reference can be made to the above statements with regard thereto. It can be seen that the gap 86 between the outer wall 14 and the first baffle disk 31 or outer collar 53 of the first baffle disk 31 is narrower than the gap 86 from FIG. 12, which shows the head region 6 of the main body, said head region being equipped with the previously described nozzle 24. Since the same main body having the same dimensions, in particular having the same inner diameter of the outer wall 14, is involved, it becomes clear that the first baffle disk 31 of the nozzle 50 has a larger outer diameter than the the first baffle disk 30 of the nozzle 24. The inner collar 52 is arranged in the radial direction directly next to the middle wall 12 of the main body 2, in particular directly next to an inner surface of the middle wall 12 of the main body 2. The remaining statements with regard to the arrangement shown in FIG. 12 can also apply to the arrangement shown in FIG. 17.

The lack of a second baffle disk and lack of an air-directing disk in the nozzle 50 in comparison to the nozzle 24 means that the atomizer air in the arrangement shown in FIG. 17, i.e. when the nozzle 50 is used, is restricted to a lesser extent than in the arrangement shown in FIG. 12, i.e. when the nozzle 24 is used. As a result, the internal nozzle pressure, i.e. in particular the pressure in the air-cap chamber 81 between the air cap 78 and the material nozzle 40, when the nozzle 50 is used, is greater than the internal nozzle pressure, i.e. in particular the pressure in the air-cap chamber 80, shown in FIG. 12, between the air cap 78 and the material nozzle 40 when the nozzle 24 is used.

The nozzle 50 shown in FIGS. 13 to 17 is preferably a low-pressure or HVLP nozzle or a nozzle for use in a low-pressure or HVLP nozzle set, or a nozzle for use in a low-pressure or HVLP spray gun.

It should finally be emphasized that the exemplary embodiments described describe only a limited selection of embodiment possibilities and therefore do not constitute any restriction of the present disclosure.

The invention claimed is:

1. A spray gun including:

a main body; and a nozzle set including:

a nozzle, the nozzle comprising a material nozzle having a hollow portion for the passage of material to be sprayed and a material outlet opening in a front end region of the material nozzle; and an air cap with a central opening and at least one diametrically opposite horn-air bore, the air cap being separate from the nozzle, wherein the material nozzle includes:

a disk element extending radially from the material nozzle and having a plurality of passage openings for the passage of air; and a first baffle disk which is arranged on the disk element and has an inner and an outer circumference, wherein the first baffle disk is arranged on the disk element directly, without a sealing element arranged inbetween, wherein the first baffle disk has a greater outer circumference than the disk element, wherein the first baffle disk is configured from continuous material in a region between the inner circumference and the outer circumference without any passage openings between the inner circumference and the outer circumference, such that air that impinges on the region between the inner circumference and the outer circumference of the first baffle disk cannot penetrate or flow through the first baffle disk, wherein the disk element is located in a middle area between the front end region of the material nozzle and a rear end region of the material nozzle, which faces away from the material outlet opening, wherein the disk element and the first baffle disk are not part of the air cap, wherein the main body includes at least one radially outer air outlet opening, at least one radially inner air outlet opening, and a middle wall lying inbetween, wherein the spray gun includes at least one first air flow path which runs from the at least one radially inner air outlet opening, past the inner circumference of the first baffle disk, through the plurality of passage openings of the disk element, into an air cap chamber formed by the air cap and the nozzle, and through a gap which is formed by the front end region of the material nozzle and the central opening in the air cap, and wherein the spray gun further includes at least one second air flow path which is separated from the first air flow path and which runs from the at least one radially outer air outlet opening, past the outer circumference of the first baffle disk, past an outer circumference of the disk element, into at least one horn-air supply duct in the air cap and through the at least one horn-air bore.

2. The spray gun according to claim 1, wherein sealing between the first air flow path and the second air flow path takes place by at least a part of the air cap, the disk element, the first baffle disk and the middle wall of the main body of the spray nozzle.

3. The spray gun according to claim 1, wherein the material nozzle further includes a second baffle disk, which is arranged in the first air flow path.

4. The spray gun according to claim 3, wherein the disk element has at least two contact surfaces arranged substantially at right angles to each other, wherein the first baffle disk has at least two contact surfaces arranged substantially at right angles to one another, and wherein the at least two contact surfaces of the first baffle disk lie directly against the at least two contact surfaces of the disk element.

5. The spray gun according to claim 3, wherein a surface of the first baffle disk facing away from the material outlet opening is set back in a direction of a nozzle longitudinal axis in relation to a surface of the disk element facing away from the material outlet opening.

6. The spray gun according to claim 5, wherein the material nozzle further includes an air-directing disk which is arranged downstream of the plurality of passage openings of the disk element in a direction of the nozzle longitudinal axis.

7. The spray gun according to claim 3, wherein the disk element has a first surface facing away from the material outlet opening and a second surface facing away from the material outlet opening, and wherein the first surface and the second surface are connected to each other in a stepped manner via a third surface.

8. The spray gun according to claim 3, wherein a surface of the disk element facing away from the material outlet opening has a groove in which the plurality of passage openings of the disk element are arranged.

9. The spray gun according to claim 3, wherein the second baffle disk has a smaller outer circumference than the first baffle disk.

10. The spray gun according to claim 3, wherein the second baffle disk has a circular outer circumference and is arranged concentrically with respect to at least one of the first baffle disk and the disk element.

11. The spray gun according to claim 3, wherein the first baffle disk and the second baffle disk are configured integrally as a single component.

* * * * *